US012574458B2

(12) United States Patent
Liu

(10) Patent No.: US 12,574,458 B2
(45) Date of Patent: Mar. 10, 2026

(54) METHOD FOR TRANSMITTING CALL AUDIO DATA AND APPARATUS

(71) Applicant: Honor Device Co., Ltd., Shenzhen (CN)

(72) Inventor: Nengbin Liu, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 202 days.

(21) Appl. No.: 18/281,130

(22) PCT Filed: Dec. 16, 2022

(86) PCT No.: PCT/CN2022/139455
§ 371 (c)(1),
(2) Date: Sep. 8, 2023

(87) PCT Pub. No.: WO2023/130938
PCT Pub. Date: Jul. 13, 2023

(65) Prior Publication Data
US 2024/0297934 A1 Sep. 5, 2024

(30) Foreign Application Priority Data

Jan. 10, 2022 (CN) .......................... 202210023402.8

(51) Int. Cl.
*H04M 3/42* (2006.01)
*G06F 3/14* (2006.01)
*H04M 7/00* (2006.01)

(52) U.S. Cl.
CPC ...... *H04M 3/42221* (2013.01); *G06F 3/1454* (2013.01); *H04M 7/0063* (2013.01); *H04M 7/0072* (2013.01)

(58) Field of Classification Search
CPC ..... H04M 3/42; H04M 3/42221; H04M 1/656
(Continued)

(56) References Cited

U.S. PATENT DOCUMENTS 9,542,143 B2 * 1/2017 Ohara ...................... G06F 3/12
11,483,359 B2 10/2022 Deng et al.
(Continued)

FOREIGN PATENT DOCUMENTS

CN 105245741 A 1/2016
CN 106790030 A 5/2017
(Continued)

*Primary Examiner* — Ahmad F. Matar
(74) *Attorney, Agent, or Firm* — Leydig, Voit & Mayer, Ltd.

(57) ABSTRACT

Embodiments of this application provide a method for transmitting call audio data and an apparatus, applied to a first electronic device, the method including: establishing a call with a peer electronic device in response to a call operation, where a second electronic device is an input and output device of sound signals during a call, and the first electronic device and the second electronic device are in a multi-screen collaboration mode; and storing call audio downlink data transmitted by the peer electronic device in a first PCM device, transmitting the call audio downlink data in the first PCM device to the second electronic device, storing call audio uplink data transmitted by the second electronic device in a second PCM device, transmitting the call audio uplink data in the second PCM device to the peer electronic device.

16 Claims, 16 Drawing Sheets

(58) Field of Classification Search
USPC ........................... 379/201.4, 201.04, 201.05
See application file for complete search history.

(56) References Cited

U.S. PATENT DOCUMENTS

| 12,261,820 | B2 * | 3/2025 | Liang et al. | ........ H04L 61/5024 |
|---|---|---|---|---|
| 2012/0165008 | A1 * | 6/2012 | Ge et al. | ................. H04W 4/00 |
| 2016/0049155 | A1 * | 2/2016 | Siemes | ................... G10L 19/02 |
| 2021/0400091 | A1 * | 12/2021 | Deng et al. | ......... H04L 65/1096 |
| 2022/0256321 | A1 * | 8/2022 | Chen et al. | ............. H04W 4/80 |
| 2022/0350564 | A1 * | 11/2022 | Cao | ....................... G06F 3/1454 |

FOREIGN PATENT DOCUMENTS

| CN | 108446092 | A | 8/2018 |
|---|---|---|---|
| CN | 110035167 | A | 7/2019 |
| CN | 111602379 | A | 8/2020 |
| CN | 111787496 | A | 10/2020 |
| CN | 112866828 | A | 5/2021 |
| CN | 113286280 | A | 8/2021 |
| CN | 113556421 | A | 10/2021 |
| WO | 2020077512 | A1 | 4/2020 |
| WO | 2021175300 | A1 | 9/2021 |

* cited by examiner

TO FIG. 4B

CONT. FROM FIG. 4A

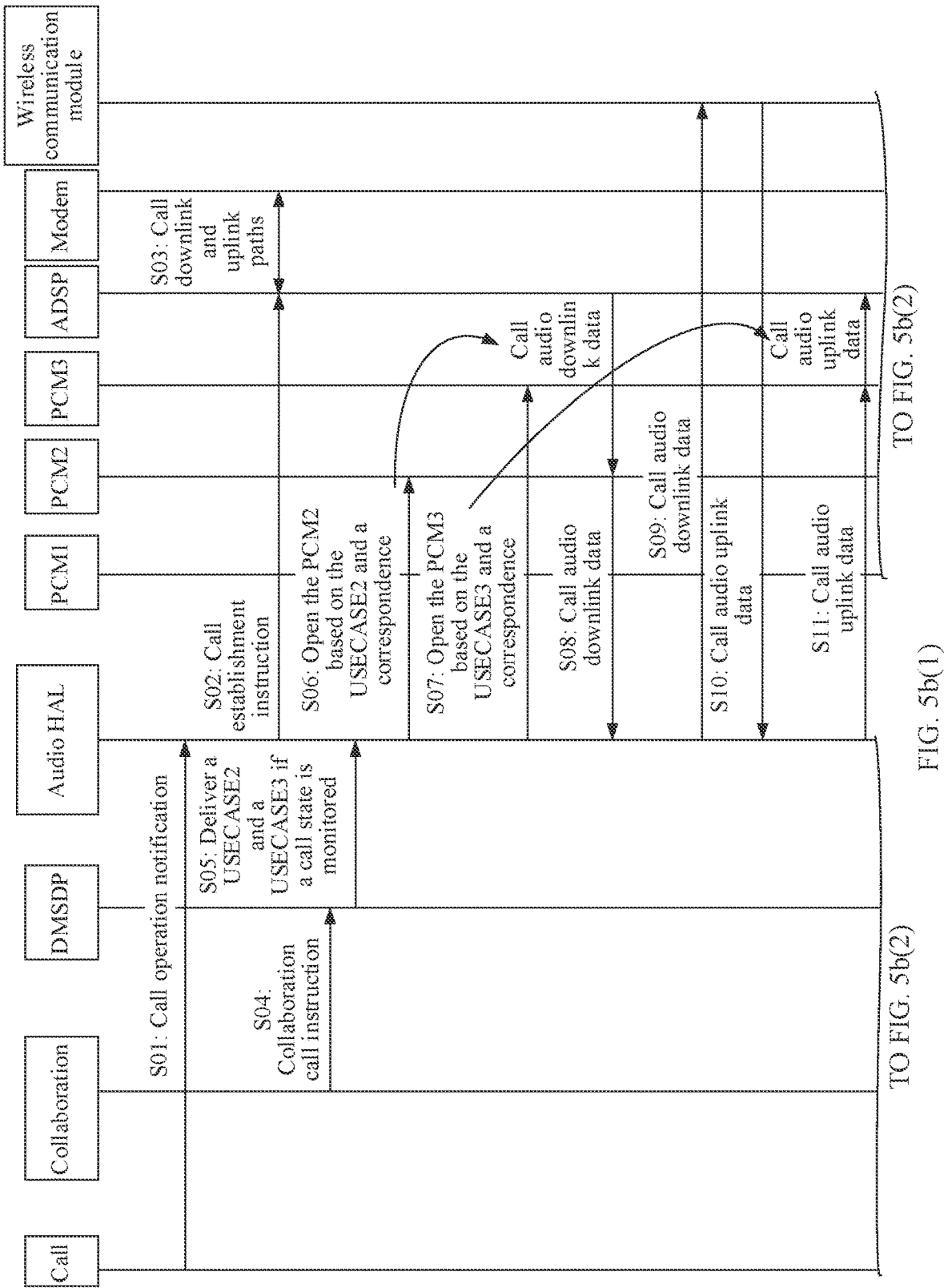
FIG. 5b(1)

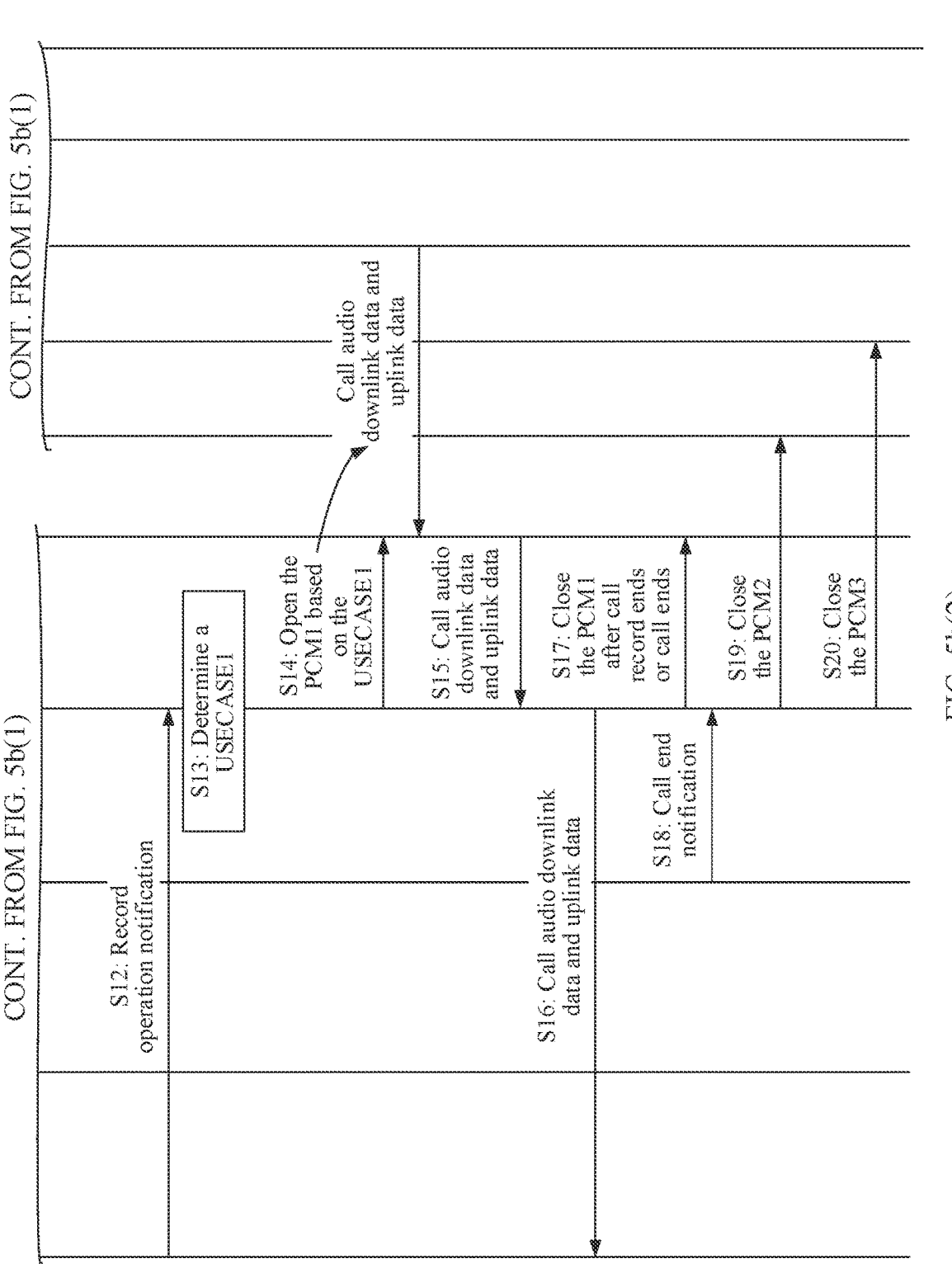
FIG. 5b(2)

CONT. FROM FIG. 6A

METHOD FOR TRANSMITTING CALL AUDIO DATA AND APPARATUS

CROSS-REFERENCE TO RELATED APPLICATIONS

This application is a national stage of International Application No. PCT/CN2022/139455, filed on Dec. 16, 2022, which claims priority to Chinese Patent Application No. 202210023402.8, filed on Jan. 10, 2022. The disclosures of both of the aforementioned applications are hereby incorporated by reference in their entireties.

TECHNICAL FIELD

This application relates to the field of communication technologies, and in particular, to a method for transmitting call audio data and an apparatus.

BACKGROUND

Call functions based on a cellular communication network is a common function of mobile phones, but electronic devices not supporting a cellular network do not have this function.

However, in a multi-screen collaboration mode, a second electronic device in collaboration with a first electronic device such as a mobile phone that supports cellular communication can implement the call function based on the cellular communication network.

SUMMARY

Embodiments of this application provide a method for transmitting call audio data and an apparatus, to implement call audio data transmission between different electronic devices.

To achieve the foregoing objective, this application provides the following technical solutions.

According to a first aspect, this application provides a method for transmitting call audio data. The method is applied to a first electronic device. The first electronic device includes a first PCM device, a second PCM device and a third PCM device. The first PCM device, the second PCM device and the third PCM device are configured to cache PCM audio data. The method includes: establishing a call with a peer electronic device in response to a call operation, where the first electronic device and the second electronic device are in a multi-screen collaboration mode, receiving call audio downlink data transmitted by the peer electronic device, storing the call audio downlink data transmitted in the first PCM device, transmitting the call audio downlink data in the first PCM device to the second electronic device, receiving call audio uplink data transmitted by the second electronic device, storing the call audio uplink data transmitted by the second electronic device in the second PCM device, transmitting the call audio uplink data in the second PCM device to the peer electronic device, and storing the call audio uplink data and the call audio downlink data in the third PCM device in response to an incall record operation. The first PCM device, the second PCM device and the third PCM device are different. It can be learned that, different PCM devices are used to respectively implement transmission and recording of the call audio uplink data and call audio downlink data, so that a possibility of cache data conflicts in a PCM device caused by multiplexing a PCM device can be reduced. Furthermore, a problem of increased power consumption caused by solving conflicts for an electronic device can further be avoided.

In some implementations, the establishing a call with a peer electronic device includes establishing a call with the peer electronic device through a modulator-demodulator Modem. The storing the call audio downlink data in the first PCM device includes opening the first PCM device and a collaboration call downlink path by opening a first PCM device file. The collaboration call downlink path is configured to connect the first PCM device and the Modem. Opening the first PCM device through the first PCM device file can simplify operations, correspond to operation logics of a software system and have good compatibility. The collaboration call downlink path is configured to connect the first PCM device to the Modem. Therefore, opening the path can implement a function of transmitting the call audio downlink data from the Modem to the first PCM device through the collaboration call downlink path, and further to the second electronic device, to further reduce complexity of implementation.

In some implementations, the transmitting the call audio downlink data to the second electronic device includes reading the call audio downlink data from the first PCM device by performing a read operation on the first PCM device file; and transmitting the call audio downlink data to the second electronic device. Performing the operation on the first PCM device to read the data in the first PCM device can simplify operations, and have good compatibility.

In some implementations, the establishing a call with a peer electronic device includes establishing a call with the peer electronic device through the Modem. The storing the call audio uplink data in the second PCM device and transmitting the call audio uplink data in the second PCM device to the peer electronic device includes opening the second PCM device and a collaboration call uplink path by opening a second PCM device file, receiving the call audio uplink data transmitted by the second electronic device; and storing the call audio uplink data in the second PCM device by performing a write operation on the second PCM device file. Opening the second PCM device file to open the second PCM device and the collaboration call uplink path. Performing the operation on the second PCM device file to write the call audio uplink data into the second PCM device. Because the collaboration call uplink path is configured to connect the second PCM device and the Modem, the call audio uplink data is transmitted from the second PCM device to the Modem through the collaboration call uplink path, and further to a peer mobile phone, to further reduce complexity to implement.

In some implementations, the establishing a call with a peer electronic device includes: establishing the call with the peer electronic device through the Modem. The storing the call audio uplink data and the call audio downlink data in the third PCM device includes: opening the third PCM device and an incall record Incall Record path by opening a third PCM device file. The incall record Incall Record path is configured to connect the third PCM device and the Modem, to further reduce complexity to implement.

In some implementations, the method further includes: obtaining the call audio uplink data and the call audio downlink data from the third PCM device by reading the third PCM device file, and recording the call audio downlink data and the call audio uplink data. It can be learned that the third PCM device can provide the call audio uplink data and the call audio downlink data for a subsequent recording, to avoid operations including audio mixing, to reduce power consumption.

In some implementations, the method further includes: closing, in response to an incall record end operation or a call end operation, the third PCM device by closing the third PCM device file. Closing the PCM device through the PCM device file can simplify operations, and have good compatibility.

In some implementations, the method further includes: in response to the call end operation, closing the first PCM device by closing the first PCM device file, and closing the second PCM device by closing the second PCM device file. Closing the PCM device through the PCM device file can simplify operations, and have good compatibility.

In some implementations, before the storing the call audio downlink data transmitted by the peer electronic device in the first PCM device, and the storing the call audio uplink data transmitted by the second electronic device in the second PCM device, the method further includes: determining the PCM device corresponding to the downlink call scenario in the multi-screen collaboration mode as the first PCM device, and the PCM device corresponding to the uplink call scenario in the multi-screen collaboration mode as the second PCM device, by querying a correspondence between a USECASE and a PCM device. It can be learned that the method can pre-configure a correspondence and modify the correspondence through the configuration, to modify a PCM device used in a scenario, to improve flexibility of the audio data transmission method.

In some implementations, before the establishing a call with a peer electronic device in response to a call operation, the method further includes displaying a collaboration window. The collaboration window includes a dialing interface or an incoming call interface displayed on the second electronic device. The establishing a call with a peer electronic device in response to a call operation includes establishing a call with the peer electronic device in response to the call operation on the dialing interface or the incoming call interface. Implementing a call function based on the collaboration window operation can improve user experience.

In some implementations, before the displaying a collaboration window; the method further includes starting the multi-screen collaboration mode with the second electronic device through near field communication NFC, Bluetooth, or in a wired manner. Diversity in implementations of the multi-screen collaboration mode can further improve user experience.

According to a second aspect, this application provides an electronic device, including a memory and at least one processor. The memory is configured to store a program. The processor is configured to execute the program, to implement the method for transmitting call audio data according to the first aspect of this application.

According to a third aspect, this application provides a computer storage medium configured to store a computer program. The computer program when executed is configured to implement the method for transmitting call audio data according to the first aspect of this application.

According to a fourth aspect, this application provides a computer program product. When operated on the computer, the computer program product is configured to implement the method for transmitting call audio data according to the first aspect of this application.

BRIEF DESCRIPTION OF DRAWINGS

FIG. 5b(1) and FIG. 5b(2) is a flowchart of a method for transmitting call audio data according to an embodiment of this application; and FIG. 6A

DESCRIPTION OF EMBODIMENTS

The following clearly and completely describes technical solutions in embodiments of the present application with reference to the accompanying drawings in the embodiments of the present application. Terms used in the following embodiments are only intended to describe particular embodiments, and are not intended to limit this application. As used in this specification and the claims of this application, a singular expression form, "one", "a/an", "the", "foregoing", or "this", is intended to also include "one or more" expression form, unless clearly indicated to the contrary in the context. It should be further understood that, in embodiments of this application, the term "and/or" describes an association relationship for describing associated objects and represents that three relationships may exist. For example, A and/or B may represent the following three cases: Only A exists, both A and B exist, and only B exists, where A and B each may be in a singular or plural form. The character "/" in this specification generally indicates an "or" relationship between the associated objects.

Reference to "one embodiment" or "some embodiments" described in this specification means that a specific characteristic, structure or feature described in combination with this embodiment is included in one or more embodiments of this application. Therefore, the statements "in one embodiment", "in some embodiments", "in some other embodiments", "in other embodiments", and the like in the differences in this specification do not necessarily refer to the same embodiment, but mean "one or more but not all embodiments", unless otherwise specially emphasized in other ways. The terms "include", "contain", "have" and their variations mean "including but not limited to", unless otherwise specially emphasized in other ways.

A plurality of involved in the embodiments of this application refers to two or more. It should be noted that, in descriptions of the embodiments of this application, terms such as "first" and "second" are merely used for distinguishing descriptions, and cannot be understood as an indication or implication of relative importance, or an indication or implication of a sequence.

Figure 1A:
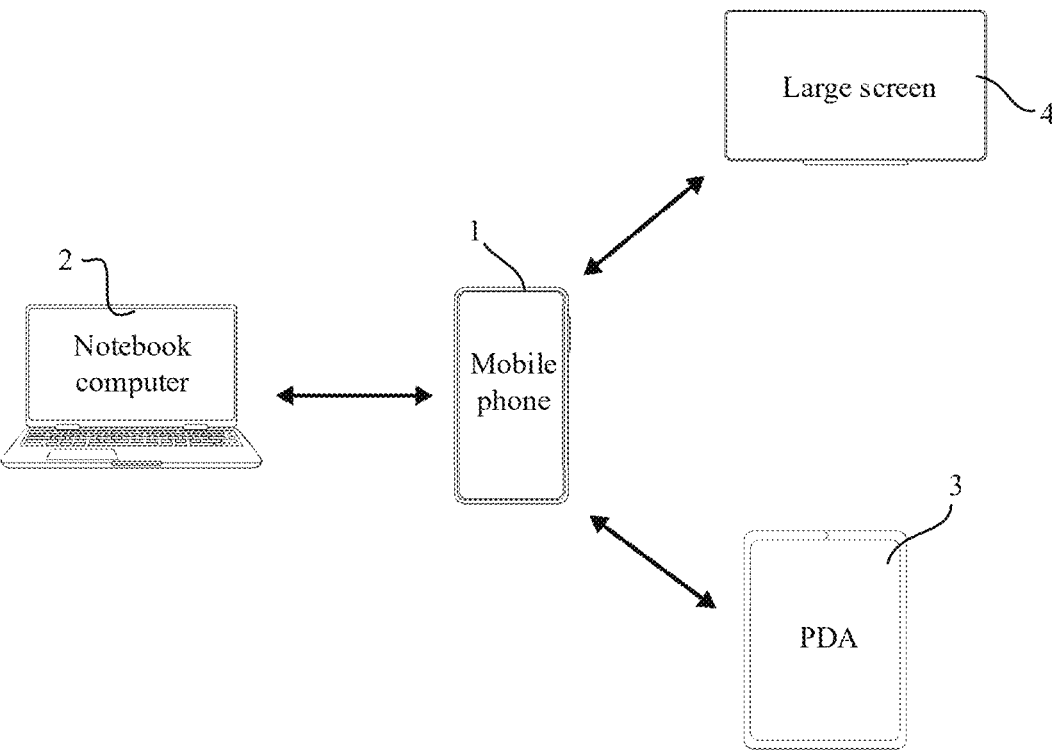
FIG. 1a is an exemplary diagram of a scenario of performing multi-screen collaboration on a plurality of electronic devices.

FIG. 1a shows an example of a scenario of multi-device collaboration. A mobile phone 1 and a notebook computer 2, a personal digital assistant (PDA) 3 and a large screen 4 can respectively enter a multi-screen collaboration mode.

In the multi-screen collaboration mode, the notebook computer 2, the PAD 3 and the large screen 4 that have no cellular communication capability, through a cellular communication capability of the mobile phone 1, can perform cellular network-based communication, including but not limited to making a call, answering a call, and making a cellular network-based video call.

Figure 1B:
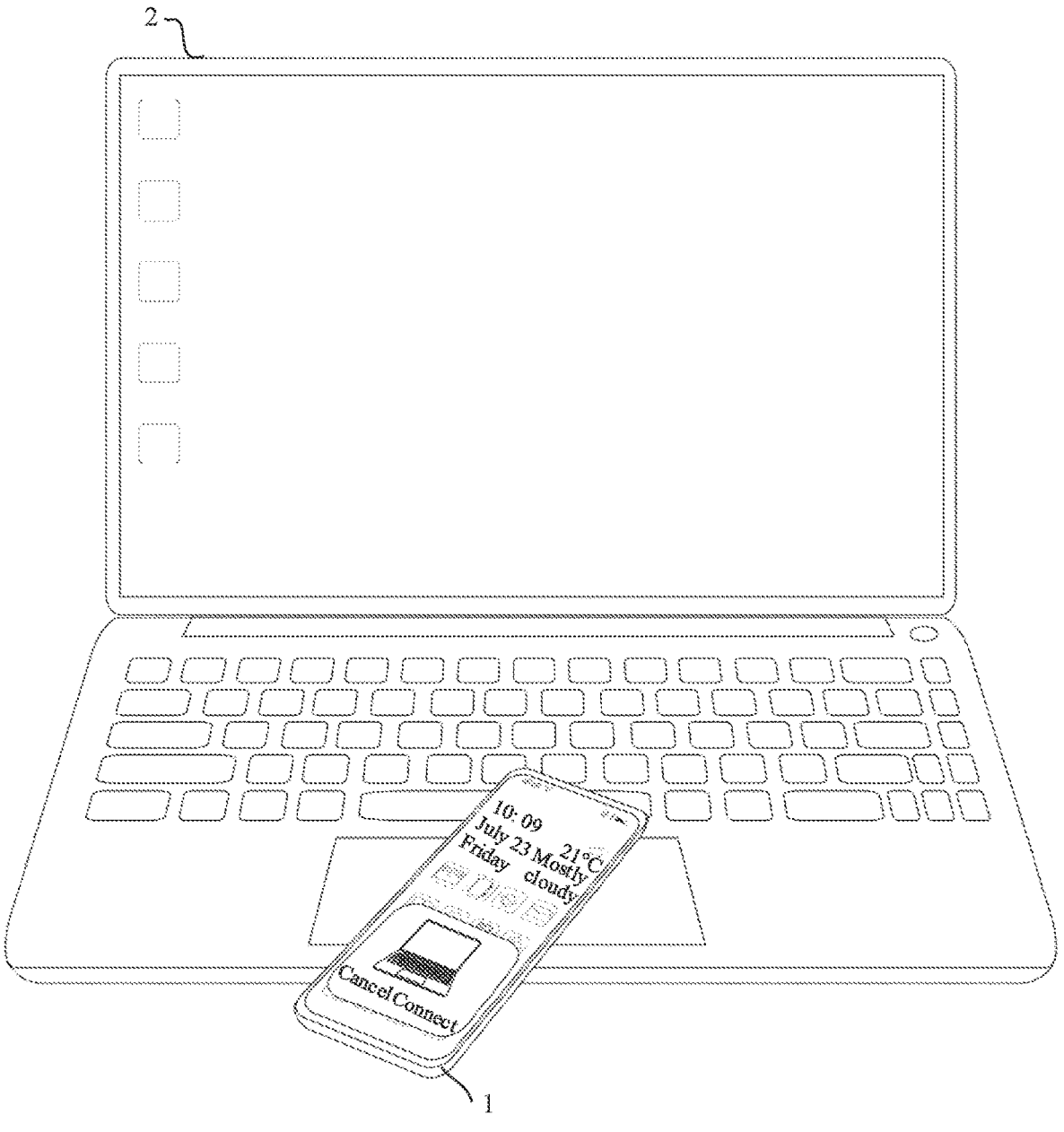
FIG. 1b is an exemplary diagram of a manner of opening multi-screen collaboration between a mobile phone and a notebook computer.
Figure 1C:
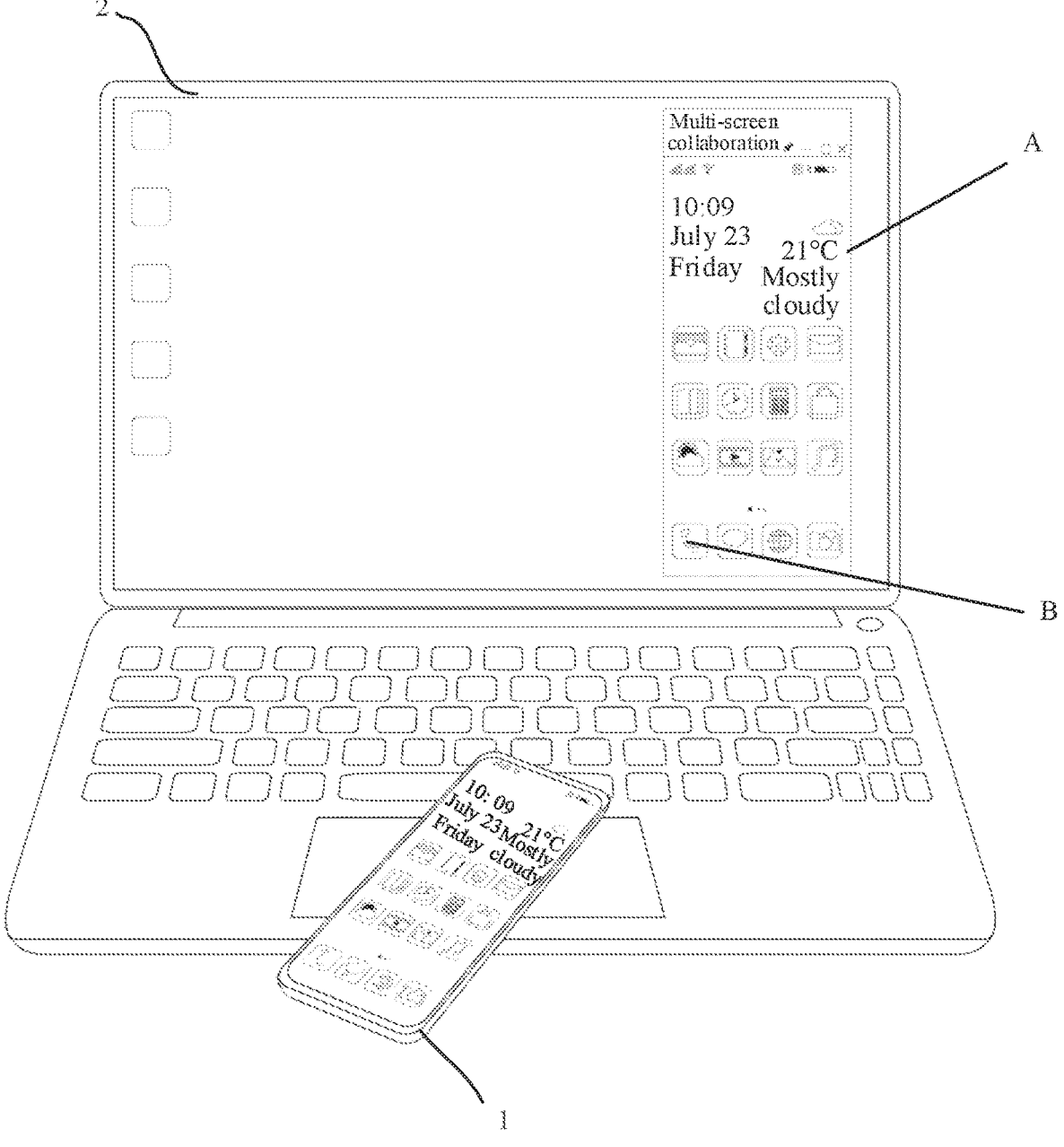
FIG. 1c is an exemplary diagram in which a notebook computer enters a multi-screen collaboration mode.

Taking FIG. 1b as an example, in a case that the mobile phone 1 enables a near field communication (NFC) function, after approaching a touchpad of the notebook computer 2 that enables the NFC function, the mobile phone 1 displays a connection interface with the notebook computer 2. As shown in FIG. 1c, after a "connect" control on the connection interface is tapped, the mobile phone 1 and the notebook computer 2 enters the multi-screen collaboration mode.

As shown in FIG. 1c, in the multi-screen collaboration mode, a collaboration window A of the mobile phone 1 is displayed on the notebook computer 2, and displayed content of the collaboration window A and content currently displayed on the mobile phone 1 are the same. Taking FIG. 1c as an example, the mobile phone 1 currently displays a desktop, and a collaboration window A of the notebook computer 2 displays a same desktop.

In the collaboration window A of the notebook computer 2, an operation that is the same as the operation on the mobile phone 1 can be performed by clicking a mouse or by tapping. For example, as shown in FIG. 1c, in a case that a desktop of the mobile phone 1 is displayed in the collaboration window A, a cursor of the mouse is placed in the collaboration window A of the notebook computer 2, and two fingers slide on the touchpad of the notebook computer 2, so that a plurality of desktops of the mobile phone can be switched in the collaboration window A.

Figure 1D:
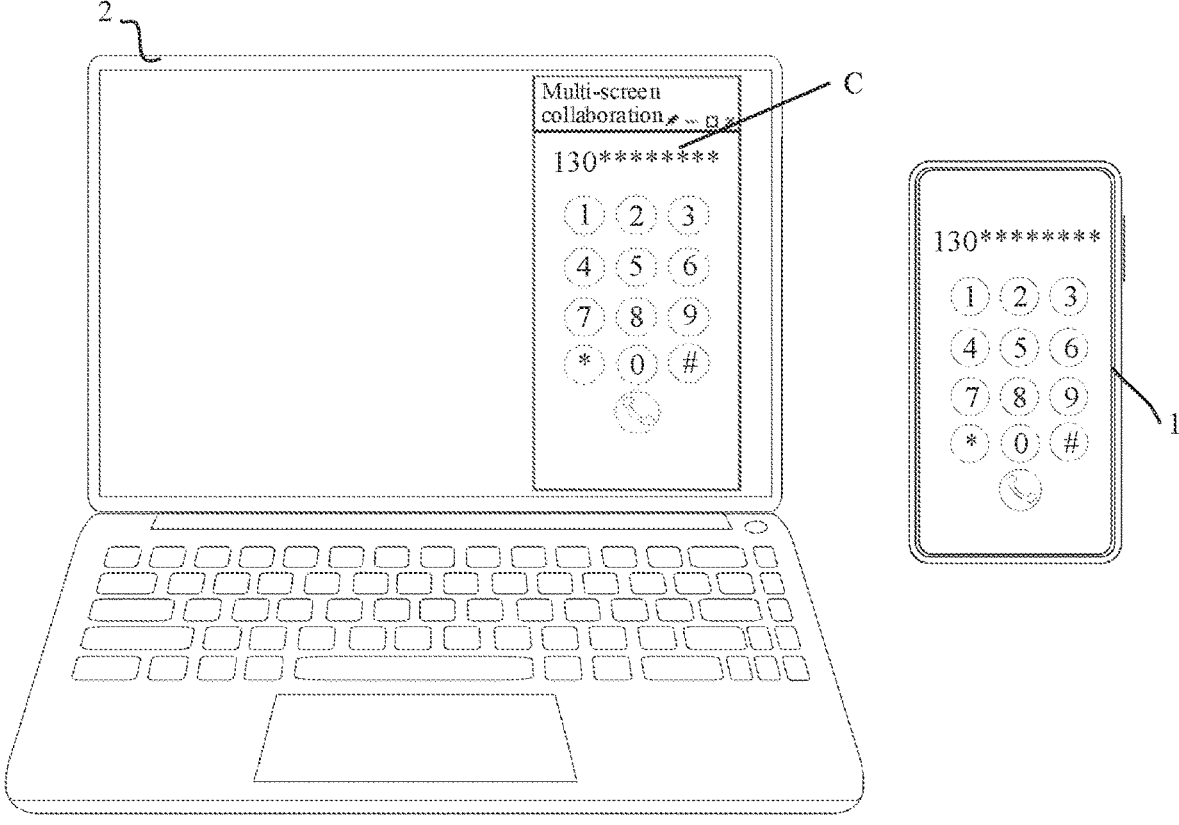
FIG. 1d is an exemplary diagram of a dialing interface when a mobile phone and a notebook computer are in a multi-screen collaboration mode.

In another example, on the notebook computer 2, an icon B of a telephone application displayed in the collaboration window A is tapped or is clicked by using a mouse to enter a collaboration dialing interface C. As shown in FIG. 1d, on the notebook computer 2, a call can be made on the collaboration dialing interface C by tapping or by clicking the mouse.

Figure 1E:
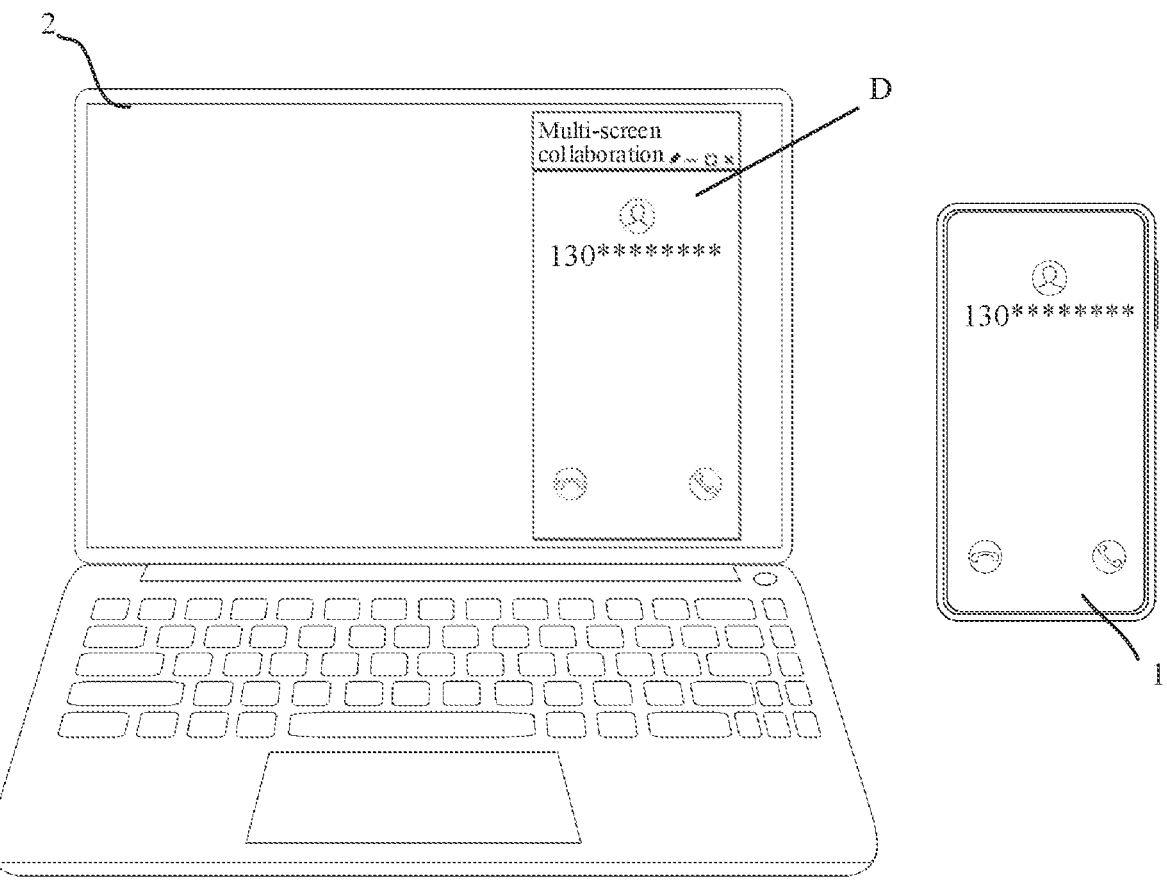
FIG. 1e is an exemplary diagram of an incoming call interface when a mobile phone and a notebook computer are in a multi-screen collaboration mode.

As shown in FIG. 1e, in the multi-screen collaboration mode, when the mobile phone 1 is called, a collaboration incoming call interface D is displayed in a collaboration desktop A of the notebook computer 2, and a call can be answered on the collaboration incoming call interface D by tapping or by clicking a mouse.

In the multi-screen collaboration mode, because the notebook computer 2 makes or answers a call through a cellular communication network of the mobile phone 1, after the call is connected, the mobile phone 1 and the notebook computer 2 need to exchange call audio data.

Embodiments of this application provide a method for transmitting call audio data, to resolve a problem of audio data transmission between devices in the multi-screen collaboration mode in a multi-screen collaboration scenario.

Embodiments of this application are applied to an electronic device with a cellular communication function. In some embodiments, the electronic device may be a mobile phone (as shown in FIG. 2), a tablet computer, a desktop computer, a laptop computer, a notebook computer, an ultra-mobile personal computer (UMPC), a handheld computer, a netbook, a personal digital assistant (PDA), a wearable electronic device, a smart watch, or the like.

Figure 2:
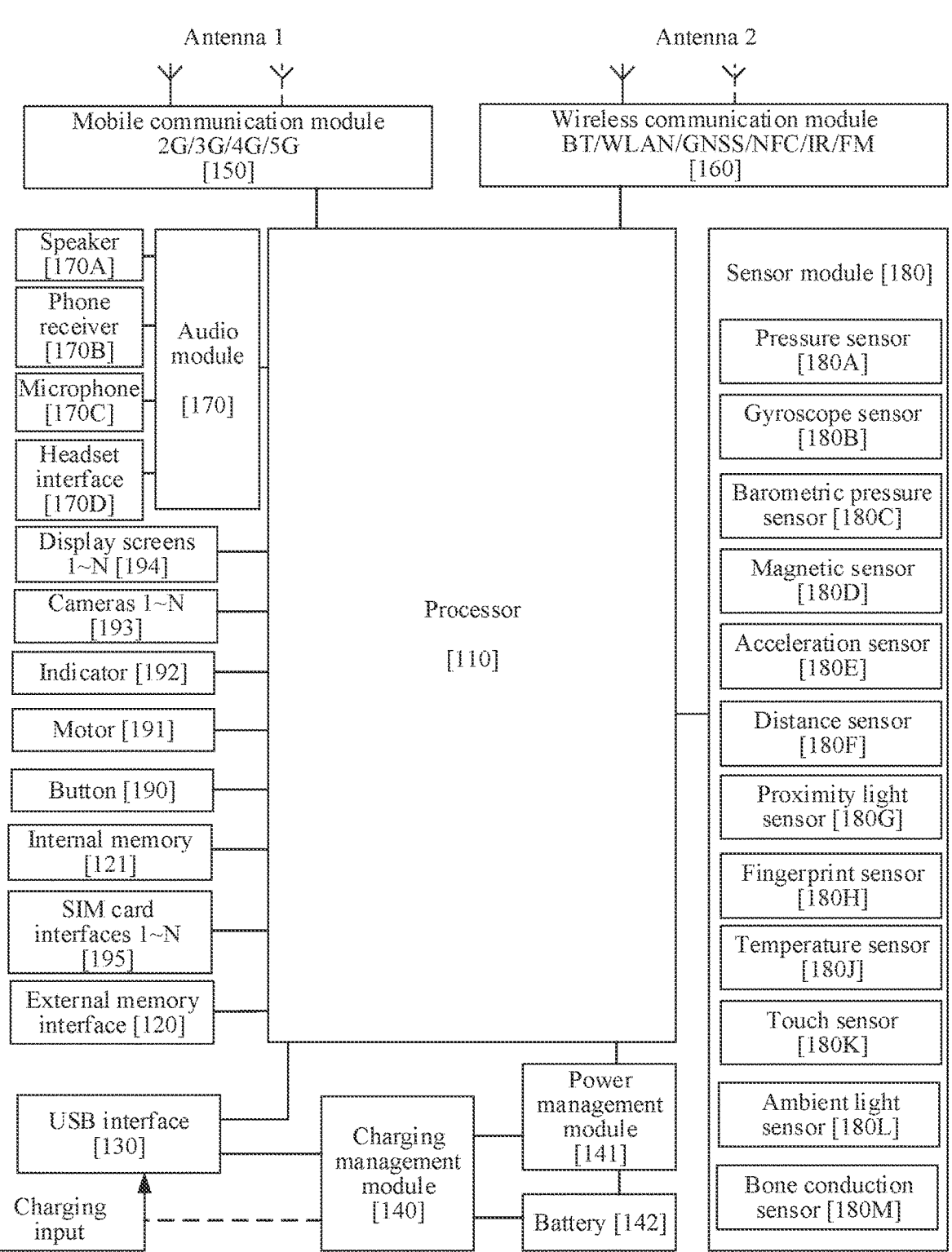
FIG. 2 is an exemplary diagram of a structure of an electronic device according to an embodiment of this application.

The mobile phone shown in FIG. 2 includes a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, and an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

It may be understood that the schematic structure in this embodiment constitutes no specific limitation on the electronic device. In some other embodiments, the electronic device may include more or fewer components than those shown in the figure, or some components may be combined, or some components may be split, or components are arranged in different manners. The components in the portrait may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), an audio signal processor (ADSP), a baseband processor, and/or a neural-network processing unit (NPU). Different processing units may be separate devices, or may be integrated into one or more processors.

A memory may also be disposed in the processor 110, configured to store instructions and data. In some embodiments, the memory in processor 110 is a cache memory. The memory may store instructions or data recently used or cyclically used by the processor 110. If the processor 110 needs to use the instruction or the data again, the processor may directly invoke the instruction or the data from the memory. Repeated access is avoided, and waiting time of the processor 110 is reduced, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface, and the like.

The I2S interface may be configured to perform audio communication. In some embodiments, the processor 110 may include a plurality of I2S buses. The processor 110 may be coupled to the audio module 170 through the I2S bus to implement communication between the processor 110 and the audio module 170. In some embodiments, the audio module 170 may transmit an audio signal to the wireless communication module 160 through the 12S interface, to perform a function of answering a call through a Bluetooth headset.

The PCM interface may also be configured to perform audio communication, to sample, quantize, and encode an analog signal. In some embodiments, the audio module 170 may be coupled to the wireless communication module 160 through a PCM bus interface. In some embodiments, the audio module 170 may also transfer an audio signal to the wireless communication module 160 through the PCM interface, to perform the function of answering a call through the Bluetooth headset. Both the 12S interface and the PCM interface may be configured to perform audio communication.

The UART interface is a universal serial data bus and is configured to perform asynchronous communication. The bus may be a bidirectional communication bus. The bus converts data to be transmitted between serial communication and parallel communication. In some embodiments, the UART interface is usually configured to connect the processor 110 to the wireless communication module 160. For example, the processor 110 communicates with a Bluetooth module in the wireless communication module 160 through the UART interface, to perform a Bluetooth function. In some embodiments, the audio module 170 may transfer an audio signal to the wireless communication module 160 through the UART interface, to perform a function of playing music through the Bluetooth headset.

It can be understood that an interface connection relationship between the modules illustrated in this embodiment is merely an example for description, and does not constitute a limitation on a structure of the electronic device. In some other embodiments of this application, the electronic device may alternatively use an interface connection manner different from that in the foregoing embodiment, or use a combination of a plurality of interface connection manners.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device may be configured to cover one or more communication frequency bands. Different antennas may further be multiplexed to improve utilization of the antennas. For example, an antenna 1 may be multiplexed as a diversity antenna of a wireless local area network. In some other embodiments, the antennas may be used with a tuning switch.

The mobile communication module 150 can provide a wireless communication solution including such as 2G/3G/ 4G/5G applied on the electronic device. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave by using the antenna 1 for radiation. In some embodiments, at least some functional modules of the mobile communication module 150 may be disposed in the processor 110. In some embodiments, at least some of the functional modules of the mobile communication module 150 may be disposed in a same device as at least some of modules of the processor 110.

The modulation and demodulation processor may include a modulator and a demodulator. The modulator is configured to modulate a low frequency baseband signal to be sent into a medium and high frequency signal. The demodulator is configured to demodulate the received electromagnetic wave signal into a low-frequency baseband signal. Then the demodulator transfers the low-frequency baseband signal obtained through demodulation to the baseband processor for processing. The low-frequency baseband signal is processed by the baseband processor and then transferred to an application processor. The application processor outputs a sound signal through an audio device (which is not limited to the speaker 170A, the telephone receiver 170B, and the like), or displays an image or a video through the display screen 194. In some embodiments, the modulation and demodulation processor may be an independent device. In some other embodiments, the modem processor may be independent of the processor 110, and is disposed in a same device as the mobile communication module 150 or another functional module.

Figure 3A:
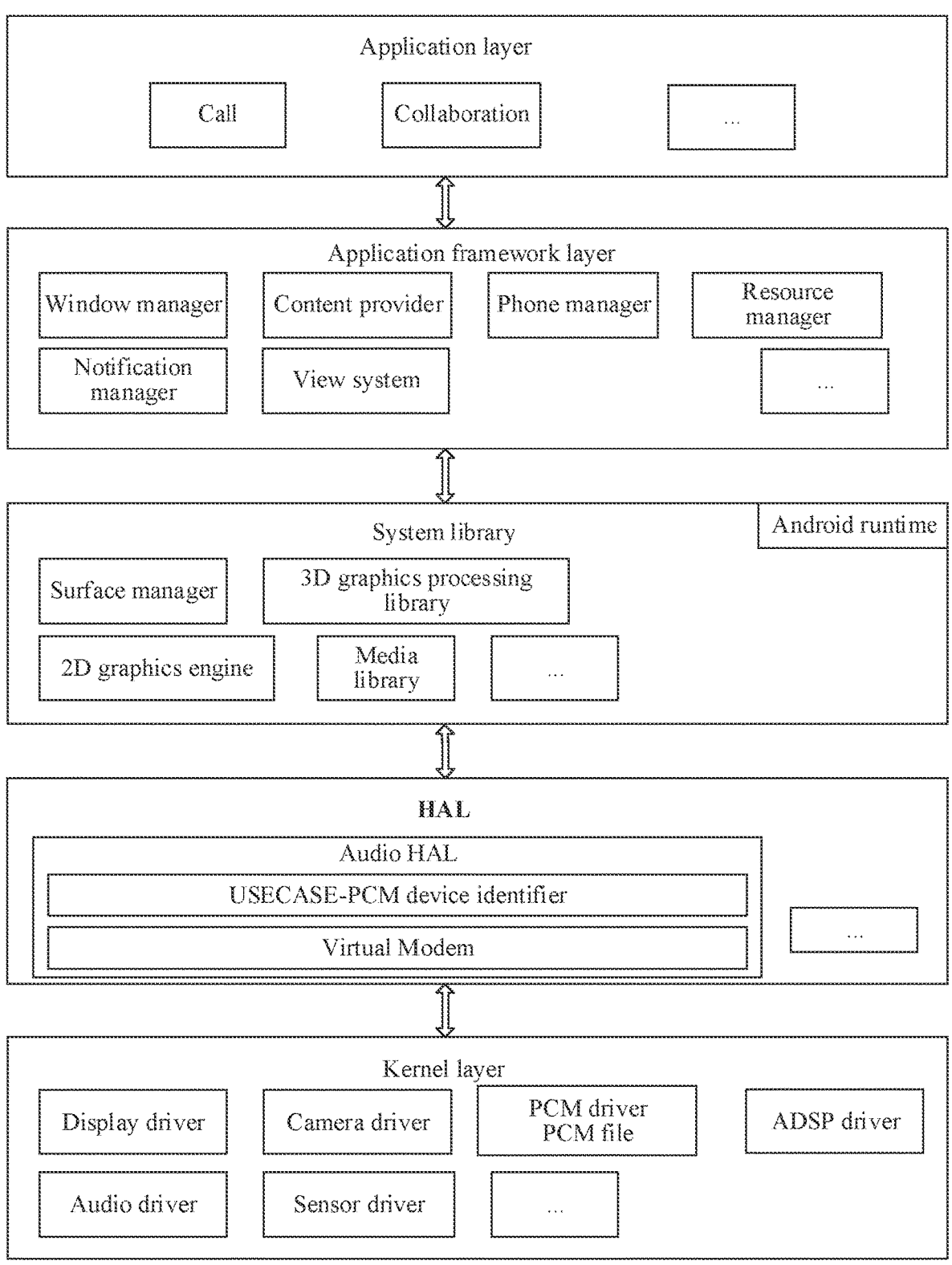
FIG. 3a is an exemplary diagram of a software framework run in an electronic device according to an embodiment of this application.

The electronic device shown in FIG. 2 device operates a software framework as shown in FIG. 3a. The software framework is a layered architecture. In the layered architecture, software is divided into several layers, and each layer has a clear role and task. The layers communicate with each other through a software interface.

For convenience of description, embodiments of this application take an Android system as an example to describe a software structure of the mobile phone 1 with the Android system.

Specifically, in some embodiments, the Android system is divided into five layers, which include an application layer, an application framework layer (or referred to as a system framework layer), a system library and Android runtime, a hardware abstraction layer (HAL), and a kernel layer from top to bottom.

The application layer includes an application. An application related to embodiments of this application includes a call application.

The call application has a function of making a call in response to a user's operation of making a call or answering a call (for example, tapping an answering key on an incoming call interface), a function of performing incall recording in response to a user's operation of starting recording (for example, tapping a recording key on a call interface), and a function of making an emergency call in response to a user's operation of making an emergency call (for example, selecting an emergency contact to call on an emergency call interface).

When the user answers a call, or makes a call, or records a call, or makes an emergency call based on the mobile phone 1, the call application generates a corresponding instruction in response to an operation performed by the user, and transmits the instruction to the application framework layer.

In some implementations, the application layer may further include a collaboration module. When the mobile phone 1 and the notebook computer 2 are in a multi-screen collaboration connection, the collaboration module is enabled and mainly responsible for monitoring a call state and controlling call logic.

The application framework layer provides an application programming interface (API) and a programming framework for the applications at the application layer. The application framework layer further includes some predefined functions. As shown in FIG. 3a, the framework layer may include a window manager, a content provider, a view system, a resource manager, a notification manager, a camera service, and the like. Modules related to embodiments of this application include a distributed mobile sensing development platform (DMSDP) and a phone manager.

With reference to a multi-screen collaboration scenario shown in FIG. 1c to FIG. 1e, the DMSDP assigns identifiers to a speaker and a microphone of the notebook computer 2, so that the speaker and the microphone of the notebook computer 2 serve as virtual devices of the mobile phone 1. In addition, the DMSDP is further configured to trigger the opening and closing of the transmission path for audio data, which will be described in detail in the following process.

The phone manager is configured to provide a call function for the mobile phone 1, for example, management of a call state (including connected and hang-up).

Specifically, the phone manager provides a service related to a call, including an audio service. When the user operates on the mobile phone 1 to answer a call, or make a call, or record a call, or make an emergency call, the call application generates a corresponding instruction in response to an operation performed by the user, and transmits the instruction to an audio service of the application framework layer.

A system library and an Android runtime includes the system library and Android runtime. The system library may include a plurality of functional modules. The android runtime is responsible for scheduling and management of the android system, including a kernel library and a virtual machine.

The system library may include a plurality of functional modules, Modules related to embodiments of this application include audio libraries. The phone manager merely provides a bridge to access the kernel library for the call application. An actual function implementation is completed in the audio libraries. For example, audio libraries include an audio service corresponding to the audio service of the application framework layer.

In some other implementations, the collaboration module may be deployed in the system library, rather than the application layer.

The Hardware abstraction layer HAL is an interface layer that is between an operating system kernel and a hardware circuit. Modules related to embodiments of this application include an Audio HAL. The Audio HAL defines a standard interface that should be implemented by the audio service to invoke the mobile phone to ensure normal running of an audio hardware function. The Audio HAL is responsible for truly associating an Audio Flinger/Audio Policy Service with a hardware device.

As shown in FIG. 3a, a correspondence between a usage scenario (USECASE) and a pulse code modulation (PCM) device identifier is pre-configured in the Audio HAL. The USECASE refers to some predefined audio scenarios. For example, record is a common recording scenario, and Voice_ call is a voice call scenario. The USECASE further has uplink and/or downlink attributes. For example, record is uplink and downlink, that is, a normal recording scene needs to obtain uplink and downlink audio data. In the correspondence between the USECASE and the PCM device identifier, each USECASE corresponds to an identifier of a PCM device used to implement the scenario.

Generally, the PCM device is considered as a software node configured to cache PCM data (for example, audio data). The PCM device is abstracted as a PCM device file, that is, a PCM device file represents a PCM device. The Audio HAL can create, open, or close the PCM device file to implement creation, opening or closing of the PCM device. The opened PCM device can cache the PCM data, and the Audio HAL can also read PCM data herein.

As shown in FIG. 3a, the Audio HAL also includes a virtual Modem. The virtual Modem is a program written in the Audio HAL. When the program is run, an operation such as opening or closing the PCM device and the path during a collaboration call can be implemented. The details will be described as follows.

The kernel layer is a layer between hardware and software. The PCM device file is stored in the kernel layer. The kernel layer further includes at least a display driver, a camera driver, an audio driver, a sensor driver, an ADSP driver, and the like.

It is to be understood that the components included in the application framework layer, the system library, and the runtime layer shown in FIG. 3a do not constitute a specific limitation on the electronic device. In an actual application, the electronic device may include more or fewer components than those shown in the figure, or some components may be combined, or some components may be split, or a different component deployment may be used.

In an implementation, based on the software framework shown in FIG. 3a and a structure of hardware 1 of the mobile phone, a call process of the mobile phone 1 is as follows.

When the user answers a call, the call application responds to a user's operation of answering a call on the mobile phone 1 (for example, tapping the answering key on the incoming call interface), generates a call start instruction, and invokes the audio service of the phone manager and the audio service of the audio library. The call start instruction is delivered to the Audio HAL, and then is further delivered to the ADSP. After the ADSP receives the call start instruction, call downlink data transmitted by a call peer mobile phone is received through the Modem and is transmitted to the speaker for play back, and call uplink data is collected by using the microphone and is transmitted to a call peer device through the Modem.

When the user makes a call, the call application responds to a user's operation of making a call on the mobile phone 1 (for example, entering Phone on a main interface, selecting a related contact, tapping to dial, or the like), and generates a call start instruction after the call peer device is connected. After the call application invokes the audio service of the phone manager and the audio service of the audio library, the call start instruction is delivered to the Audio HAL, and then is further delivered to the ADSP. After the ADSP receives the call start instruction, the call downlink data transmitted by the call peer mobile device is received and is transmitted to the speaker for playback, and the call uplink data is collected by using the microphone and is transmitted to the call peer device.

In some scenarios, the ADSP can further transmit the call downlink data to the telephone receiver for play back, or transmit the call downlink data to a wired headset through the headset interface for playback, or transmit the call downlink data to a wireless headset through Bluetooth for playback. In this case, the call uplink data obtained by the ADSP may further be collected by using a wireless headset or a wired headset connected to the mobile phone 1. This is not limited in embodiments of this application.

The ADSP is digital signal processor for processing audio.

Figure 3B:
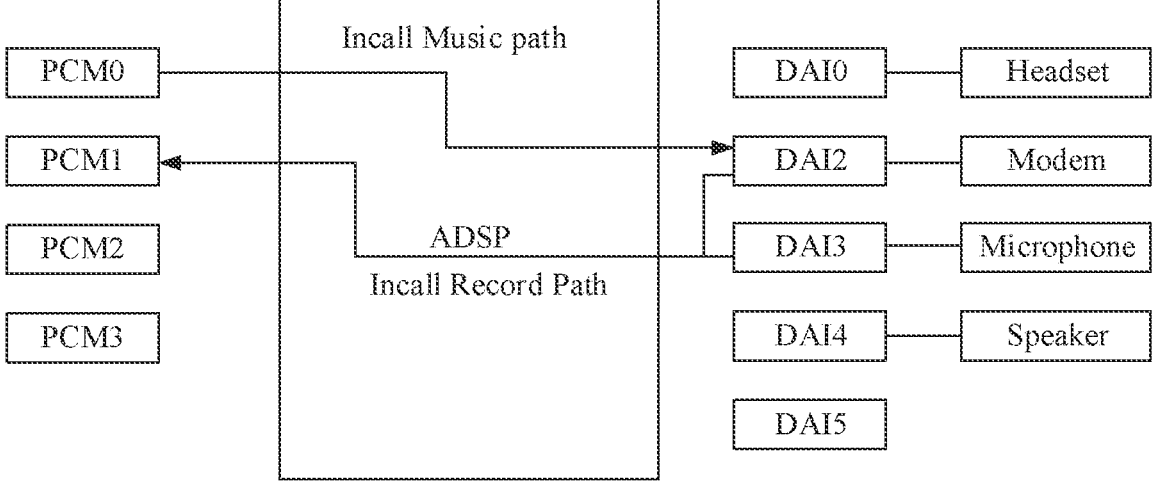
FIG. 3b is an exemplary diagram of audio paths.

As shown in FIG. 3b, PCM0, PCM1, . . . , and PCM3 are PCM devices. DAI0 . . . , and DAI5 are interfaces, and a headset, a speaker and the like are audio devices. The ADSP is configured to connect the PCM device to the interface. The path connecting the PCM device and the audio device is referred to as an audio path. It can be understood that the audio path includes a communication part and an interface in the ADSP It is assumed that the PCM1 is configured to cache call audio uplink data and call audio downlink data. An example of the audio path is an Incall Record path. The Incall Record path is an audio path connecting the PCM1 to the microphone and the Modem. It is assumed that the PCM0 is configured to cache emergency call data (that is, a piece of fixed audio data), the Incall Music path is an audio path connecting the PCMP0 to the Modem.

It can be understood that, because the audio path in the ADSP is configured to exchange data with the PCM device, and the interface and the audio device are generally in an opened state after the electronic device is started, the audio path is also opened when the PCM device is opened through the PCM device file.

Figure 3C:
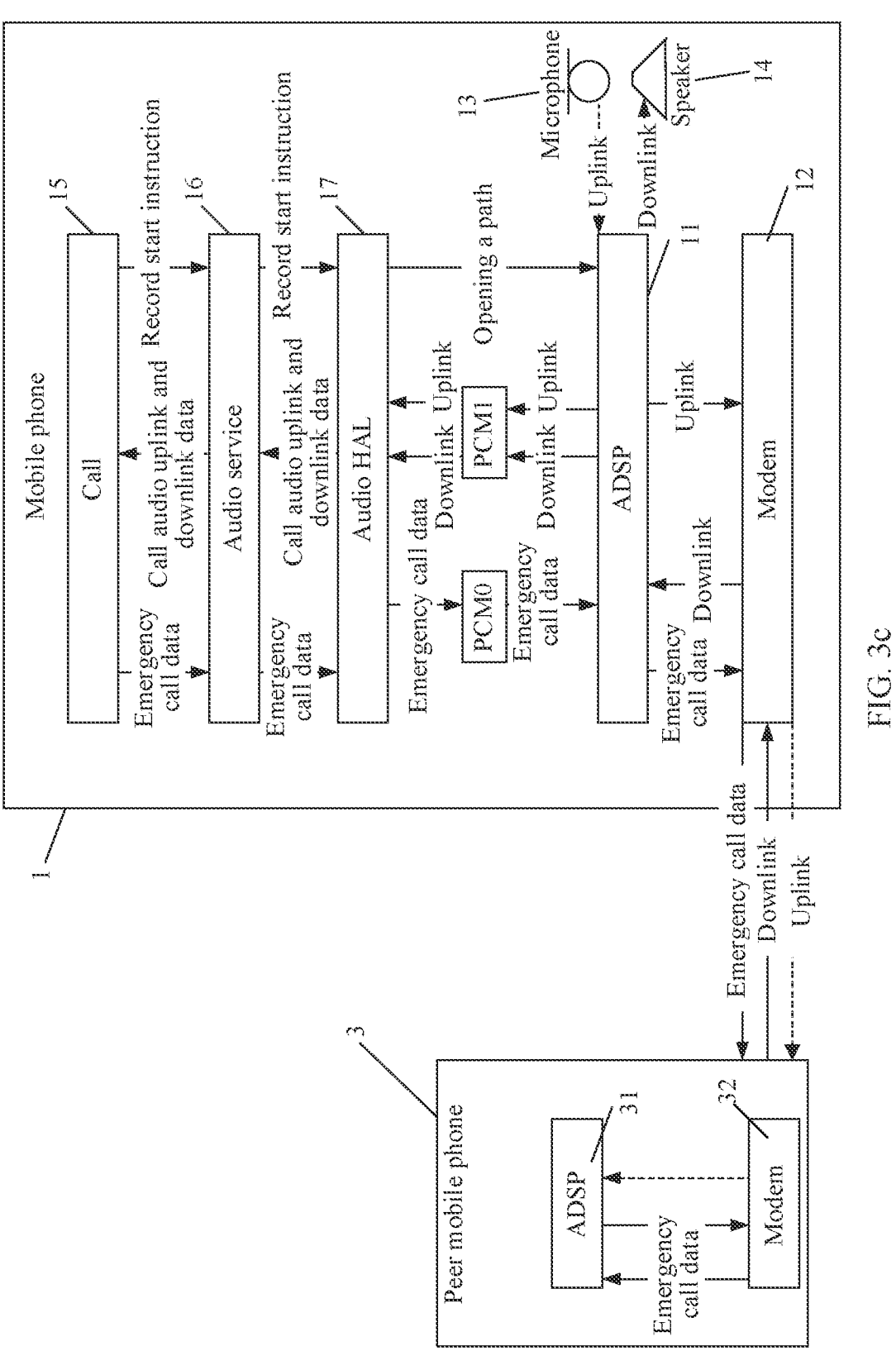
FIG. 3c is an exemplary diagram of audio data transmission when the audio paths shown in FIG. 3b during a call and making an emergency call.

Based on FIG. 3a and FIG. 3b, FIG. 3c shows a process of implementing an incall record function by the mobile phone 1.

Call audio downlink data transmitted by a peer mobile phone 3 is received by an ADSP11 of the mobile phone 1 through a Modem12, and is transmitted to a speaker 14 for playback. Call audio uplink data collected by using a microphone 13 is obtained and transmitted to the peer mobile phone 3 through the Modem12. An ADSP31 and a Modem32 exchange call audio data in the peer mobile phone 3.

After a recording control is tapped in the incoming call interface displayed by a call application 15 in the mobile phone 1, the call application 15 generates a record start instruction, invokes the audio service in the phone manager and the audio service in the audio libraries (collectively referred to as an audio service 16 in FIG. 3c), and delivers the record start instruction to an Audio HAL17.

The Audio HAL17 determines a USECASE corresponding to a call record instruction as a USECASE1 (uplink and downlink), and determines, through a correspondence between the USECASE1 and the PCM1, the PCM device obtaining call audio as the PCM1.

The Audio HAL17 opens the PCM1 and the Incall Record path by opening a PCM1 device file. The Incall Record path transmits the call audio uplink data and the call audio downlink data to the PCM1 for cache. The Audio HAL17 reads the PCM1 device file to obtain the call audio uplink data and the call audio downlink data from the PCM1. The Audio HAL17 transmits the obtained call audio uplink data and the call audio downlink data to the call application 15 through the audio service in the audio libraries and the audio service in the phone manager (collectively referred to as the audio service 16 in FIG. 3c). The call application 15 stores the call audio uplink data and the call audio downlink data in a preset format, to complete the incall record function.

FIG. 3c shows a process in which the mobile phone 1 implements an emergency call (where the emergency call refers to transmitting fixed audio to a designated phone number, to remind a user hereof to call the police for the user of the mobile phone 1) based on FIG. 3a and FIG. 3b.

When the user makes an emergency call, the call application 15 responds to a user's operation of making an emergency call (for example, tapping an emergency call key on a lock screen interface, tapping personal emergency information, and selecting an emergency contact to dial), and writes emergency call data (where the emergency call data is a piece of fixed audio data) into the audio service of the phone manager. Then emergency call data is written from the audio service of the phone manager into the audio service of the audio libraries, and then is written from the audio service of the audio libraries (collectively referred to as the audio service 16 in FIG. 3c) into the Audio HAL17. The Audio HAL17 opens a PCM0 device file, to open the PCM0 and the Incall Music path, and writes the emergency call data into the PCM0. The Incall Music path transmits the emergency call data to the Modem12. The Modem12 transmits the emergency call data to the peer mobile phone, so that the user of the peer mobile phone as an emergency contact can help the user of the mobile phone 1 to make a call for help.

To meet a requirement of transmitting the call audio data between the mobile phone 1 and the notebook computer 2 in a multi-screen collaboration scenario, in some implementations, the Audio HAL17 in the mobile phone 1 multiplexes the PCM device and the audio path, and exchanges the call audio data with the notebook computer 2. Being multiplexed in the multi-screen collaboration scenario means that there is originally a data transmission function to be realized, but in the multi-screen collaboration scenario, the function of call audio data transmission is also to be undertaken.

Figure 4A:
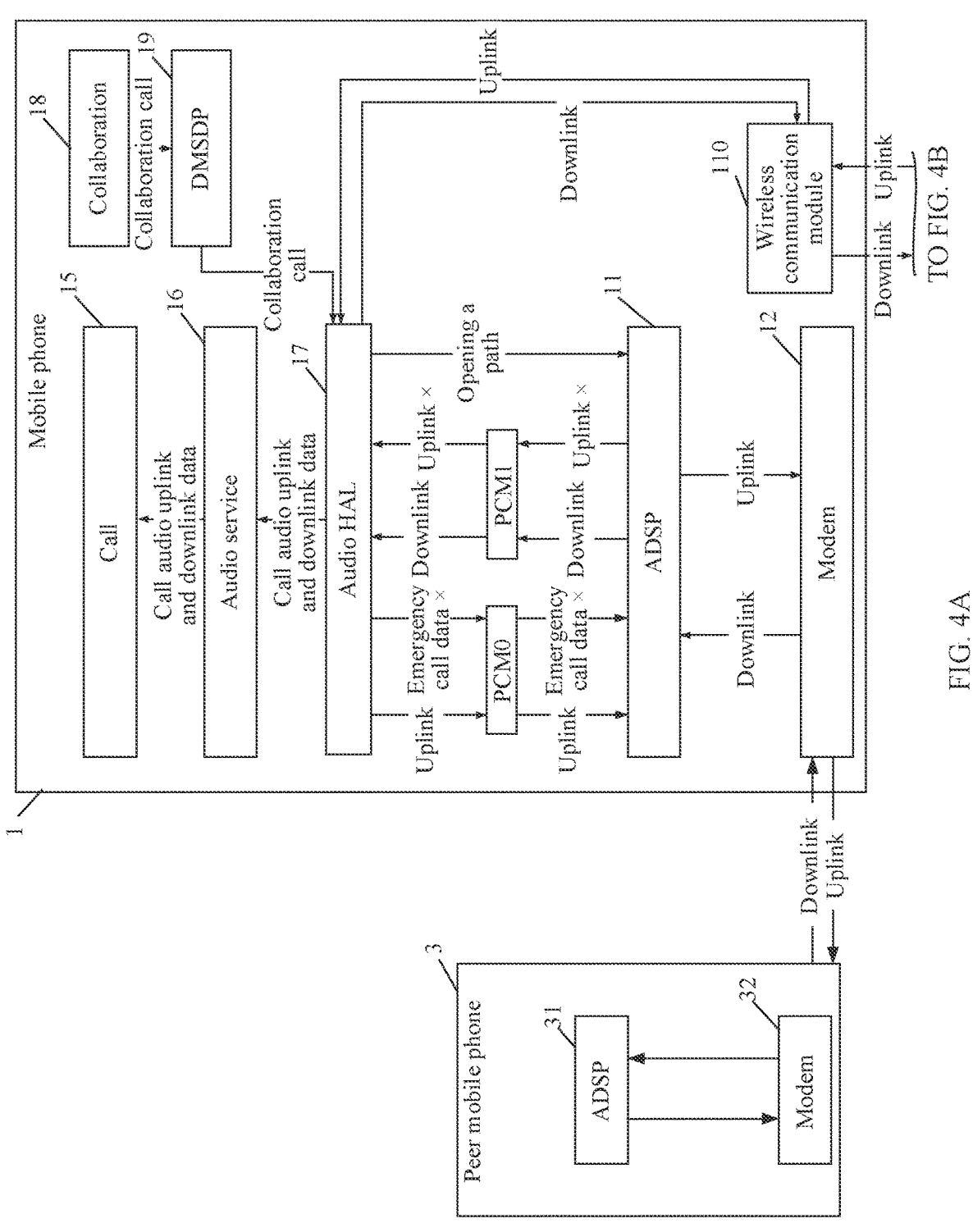
FIG. 4A and FIG. 4B is an exemplary diagram of another call audio data transmission in a multi-screen collaboration mode according to an embodiment of this application.
Figure 4B:
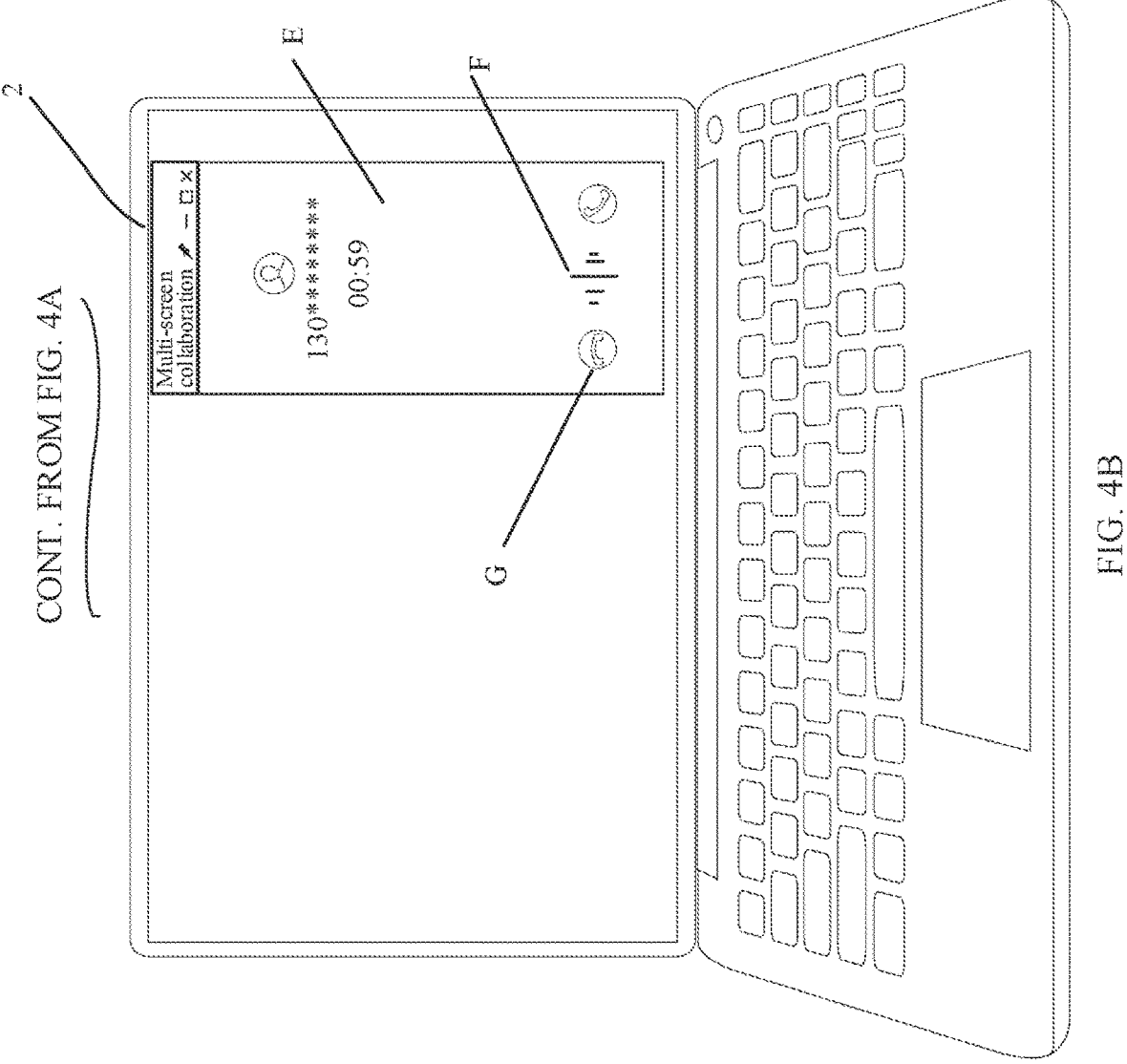

Taking FIG. 4A and FIG. 4B as an example, the PCM1 is multiplexed to transmit the call audio downlink data to the notebook computer 2. A collaboration module 18 and a DMSDP module 19 monitor a call in multi-screen collaboration, and deliver a collaboration call instruction to the Audio HAL17. The Audio HAL17 determines the USECASE as an audio call downlink scenario corresponding to PCM1. The Audio HAL17 opens the PCM1. The PCM1 caches the call audio downlink data transmitted through the Incall Record path, and the call audio uplink data is no longer transmitted. The Audio HAL17 transmits the call audio downlink data in the PCM1 to the notebook computer 2 through a wireless communication module 110.

In this case, if the user enables the incall record function in the mobile phone 1, as shown in FIG. 3c, the Audio HAL17 needs to obtain the downlink data and the uplink data from the PCM1. However, as shown in FIG. 4A and FIG. 4B, the PCM1 only caches the downlink data in a collaboration call scenario. It can be learned that the record function conflicts with a collaboration call function.

One way to address the conflict is to perform audio mixing on the uplink data and the downlink data in the Audio HAL17, and then transmit mixed data to the call application 15. It can be understood that addressing the conflict will increase power consumption of the mobile phone 1.

Taking FIG. 4A and FIG. 4B as an example, the PCM0 is multiplexed to receive the call audio uplink data transmitted by the notebook computer 2. To be specific, after the Audio HAL17 receives, through the wireless communication module 110, the uplink data transmitted by the notebook computer 2, the uplink data is cached in the PCM0. The Incall Music path transmits the uplink data to the Modem12, and the Modem12 transmits the uplink data to the peer mobile phone 3.

It can be understood that, in the collaboration call scenario, if the user enables the emergency call function, the two functions cause a conflict of the data cached in the PCM0.

It can be learned that in the multi-screen collaboration mode, multiplexing the PCM device and the audio path, and exchanging call audio data with a collaboration device may cause a conflict in some cases.

To resolve the foregoing conflicts, embodiments of this application provide the following improvement manners.

In addition to configuring the correspondence between the audio call USECASE and the PCM1 (that is, a third PCM device), the Audio HAL also configures correspondences as follows.

A correspondence between the scenario of call audio downlink data transmission in a multi-screen collaboration, referred to as USECASE2 in short, and a PCM2 (that is, the first PCM device).

A correspondence between the scenario of call audio uplink data transmission in the multi-screen collaboration, referred to as USECASE3 in short, and a PCM3 (that is, the second PCM device).

The PCM2 device and the PCM3 device are different PCM devices. PCM2 and PCM3 are PCM devices different from PCM1. With reference to the incall record process, it can be learned that the PCM1 is configured to obtain the call audio uplink data and the call audio downlink data. The PCM2 is configured to obtain the call audio downlink data. The PCM3 is configured to obtain the call audio uplink data.

Figure 5A:
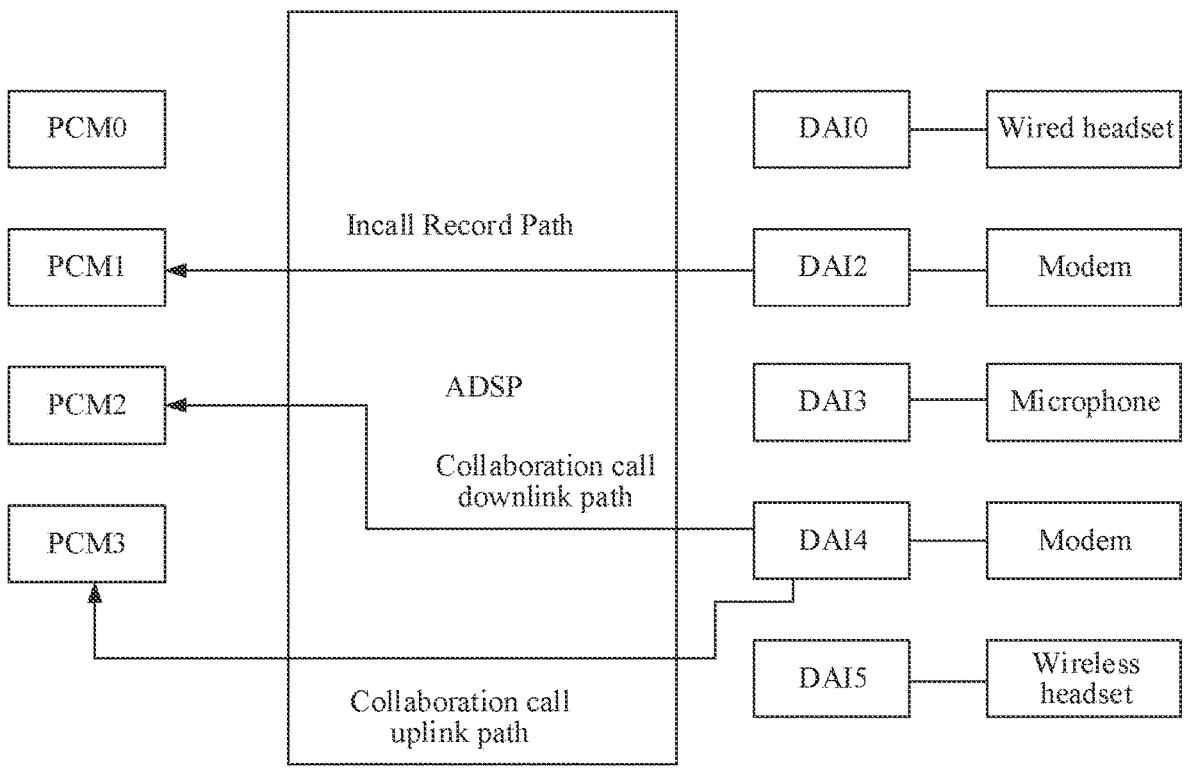
FIG. 5a is an exemplary diagram of audio paths according to an embodiment of this application.

As shown in FIG. 5a, the path configured to transmit the call audio downlink data is referred to as a collaboration call downlink path for short, and the path configured to transmit the call audio uplink data is referred to as a collaboration call uplink path for short.

It can be understood that the collaboration call downlink path connects the PCM2 to the Modem. The collaboration call uplink path connects the PCM3 to the Modem.

It can be understood that, in some implementations, a built-in or external speaker and a microphone of the notebook computer 2 are configured as virtual devices of the mobile phone 1 by the DMSDP. The built-in or external speaker of the notebook computer 2 is referred to as a virtual speaker. The built-in or external microphone of the notebook computer 2 is referred to as a virtual microphone.

It should be noted that the USECASE is not a required parameter to be configured. In other words, the USECASE may not be configured, but the correspondence between the collaboration call and the PCM2 and PCM3 is configured.

It can be understood that the correspondence can be configured by using acdb files, XML configuration files, and the like.

Based on the configuration, the audio data can be transmitted between devices in the multi-screen collaboration mode in the multi-screen collaboration scenario. FIG. 1a shows an example of a multi-screen collaboration scenario. The mobile phone 1 with a cellular communication capability can enter the multi-screen collaboration mode with 2, 3 and 4 shown in FIG. 1a.

According to FIG. 1b and FIG. 1c, the mobile phone 1 and the notebook computer 2 enter the multi-screen collaboration mode in an NFC manner. It can be understood that the NFC manner is only an example of entering the multi-screen collaboration mode, and the multi-screen collaboration mode may also be entered through Bluetooth, wired connection, or the like. Details are not repeated herein.

In the multi-screen collaboration mode, the interface for making a call can be entered by operating an interface of the mobile phone 1 or an interface displayed in the collaboration window of the notebook computer 2 as shown in an interface C shown in FIG. 1d, or when there is an incoming call, both the mobile phone 1 and the notebook computer 2 display an incoming call reminder interface, for example, an interface D shown in FIG. 1e.

After the user makes a call on the notebook computer 2, or after the user answers a call on the notebook computer 2, the process shown in FIG. 5b(1) and FIG. 5b(2) is triggered to be implemented, including the following steps:

S01: The call application transmits a call operation notification to the Audio HAL.

The call application responds to an operation of making a call or answering a call, and transmits the call operation notification to the Audio HAL.

In some implementations, the call application displays as the dialing interface shown in FIG. 1d. The user makes a call on the dialing interface. The call application responds to the operation of making a call, and transmits, to the Audio HAL, a notification that indicates the operation of making a call.

In some other implementations, the user taps an answering control on the incoming call reminder interface shown in FIG. 1e. The call application responds to a tapping operation on the answering control, switches the dialing interface to the call interface, and transmits, to the Audio HAL, a notification of answering a call.

Figure 6A:
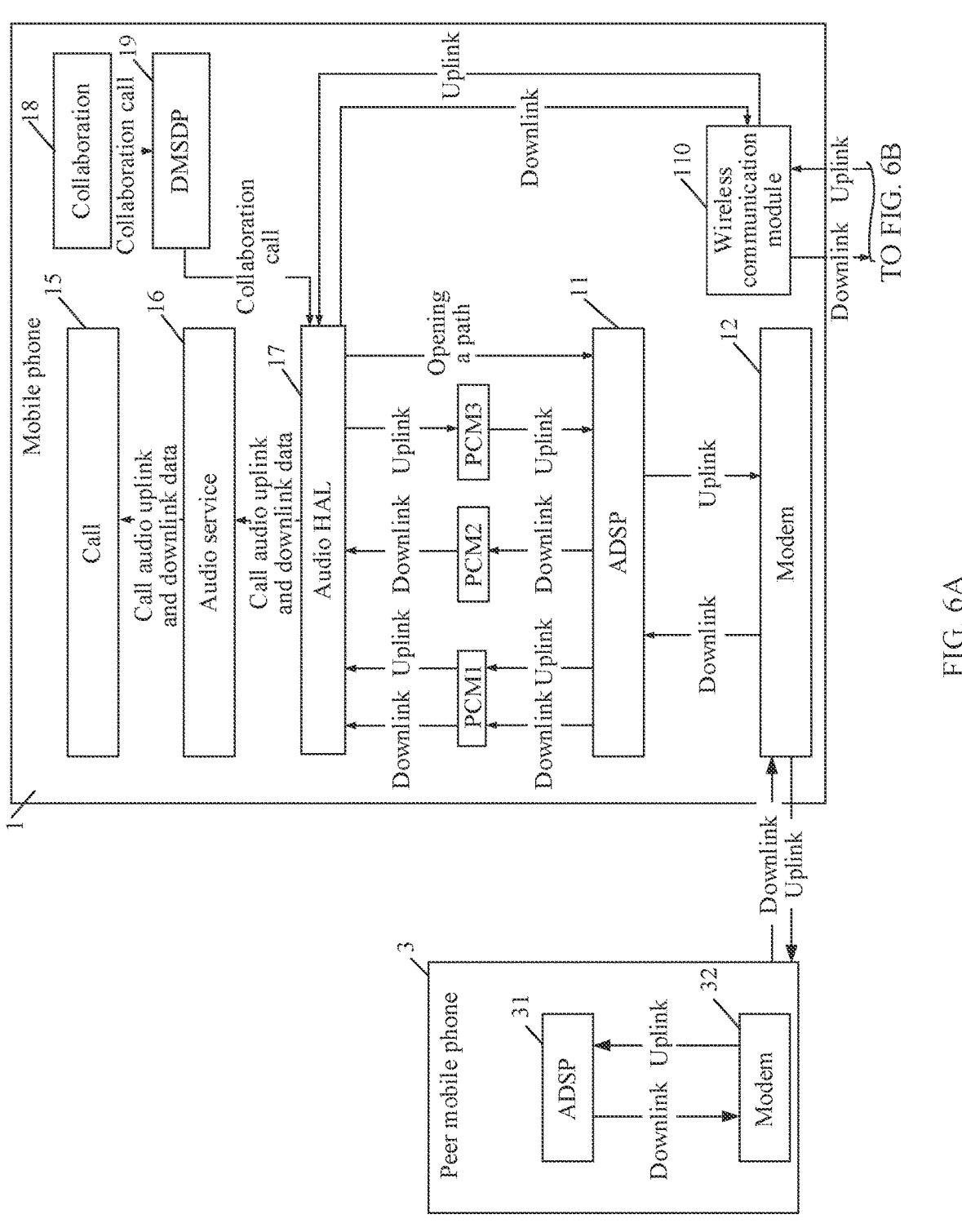
FIG. 6B is still another audio data transmission in a multi-screen collaboration mode according to an embodiment of this application.

It can be understood that, as shown in FIG. 6A, the call application 15 transmits a notification of the call operation notification to the Audio HAL17, through the audio service in the phone manager and the audio service in the audio libraries (collectively referred to as the audio service 16 in FIG. 6A).

S02: The Audio HAL delivers a call establishment instruction to the ADSP in response to the call operation notification.

In some implementations, the Audio HAL delivers the call establishment instruction to the ADSP through the ADSP driver shown in FIG. 3a.

S03: Establish a call downlink path and a call uplink path between the ADSP and the Modem.

It can be understood that, with reference to FIG. 6A, the ADSP11 and the Modem12 of the mobile phone 1, and the ADSP31 and the Modem32 of the peer mobile phone establish a call process between the mobile phone 1 and the peer mobile phone 3 based on a cellular communication protocol. In this way, the call downlink path and the call uplink path are established between the ADSP11 and the Modem12.

It can be understood that after the call downlink path and the call uplink path are established, if the call audio data has been generated, the call audio data can be transmitted on the paths.

S04: The collaboration module delivers collaboration call instructions to the DMSDP.

With reference to FIG. 6A, after the multi-screen collaboration mode is enabled, if a call state is monitored in the multi-screen collaboration mode, the collaboration module 18 delivers collaboration call instructions to the DMSDP19.

S05: After receiving the collaboration call instructions, if the call state is monitored, the DMSDP delivers, to the Audio HAL, instructions that instruct the USECASE2 and the USECASE3.

In some implementations, as shown in FIG. 6A, instructions that instruct the USECASE2 and the USECASE3 can be included in the collaboration call instructions delivered to the Audio HAL17 by the DMSDP19 shown in FIG. 6A.

It can be understood that, in some implementations, in a case that the USECASE2 and the USECASE3 are not configured, the DMSDP16 can deliver instructions that invoke the PCM2 and the PCM3 to the Audio HAL17. As shown in FIG. 6A, the instructions that invoke the PCM2 and the PCM3 can be included in the collaboration call instructions delivered to the Audio HAL17 by the DMSDP19.

The DMSDP monitors the call state to complement and verify a monitoring result of the collaboration module. This can ensure an accuracy of the monitoring result.

S06: The Audio HAL opens the PCM2 based on the USECASE2 and the pre-configured correspondence.

In some implementations, the virtual Modem opens the PCM2 device file to open the PCM2. After the PCM2 is opened, as shown in FIG. 5*a*, the collaboration call downlink path connected between the PCM2 and the Modem is opened.

In some implementations, S06 is performed by the virtual Modem in the Audio HAL.

S07: The Audio HAL opens the PCM3 based on the USECASE3 and the pre-configured correspondence.

It can be understood that the sequence of S06 and S07 is not limited herein.

In some implementations, the PCM3 device file is opened to open the PCM3. After the PCM3 is opened, the collaboration call uplink path connected between the PCM3 and the Modem is opened.

In some implementations, S07 is performed by the virtual Modem in the Audio HAL.

In a case that the USECASE2 and the USECASE3 are not configured, the Audio HAL opens, based on instructions that invoke the PCM2 and the PCM3, the PCM2 device file and the PCM3 device file, to open the PCM2, the PCM3, the collaboration call downlink path and the collaboration call uplink path.

Because the call paths are established between the Modem12 and the ADSP11 in S03, as shown in FIG. 6A, after the PCM2 is opened, the PCM2 caches the call audio downlink data transmitted to the ADSP11 by the Modem12.

S08: The Audio Hal reads the call audio downlink data from the PCM2.

In some implementations, the Audio HAL performs a read operation on the PCM2 device to read the call audio downlink data from the PCM2.

In some implementations, S08 is executed by the virtual Modem in the Audio HAL.

S09: The Audio Hal transmits the call audio downlink data to the wireless communication module.

With reference to FIG. 6A, the Audio HAL invokes the wireless communication module 110 and transmits the call audio downlink data to the notebook computer 2. The speaker of the notebook computer 2 plays the call audio downlink data.

In some implementations, S09 is performed by the virtual Modem in the Audio HAL. In some other implementations, S09 is performed by an audio hardware management module in the Audio HAL.

S10: The Audio HAL receives the call audio uplink data from the wireless communication module.

It can be understood that, the user voice (that is, the call audio uplink data) collected by the notebook computer 2 is cached, and transmitted to the wireless communication module 110. The Audio HAL17 invokes the wireless communication module to receive the call audio uplink data.

S11: The Audio HAL caches the call audio uplink data in the PCM3.

In some implementations, the Audio HAL performs a write operation on the PCM3 device file to cache data in the PCM3.

It can be understood that, because call paths are established between the Modem and the ADSP in S03, as shown in FIG. 6A, after the PCM3 is opened, the call audio uplink data cached in the PCM3 is transmitted to the ADSP11, and further transmitted to the Modem12, and then transmitted to the peer mobile phone 3 through the Modem12.

In some implementations, S10 and S11 are performed by the virtual Modem in the Audio HAL. In some other implementations, S10 and S11 are performed by the audio hardware management module in the Audio HAL.

In the call process, if the user taps the recording control on the call interface to enable the call record function, S12 to S17 are performed.

S12: The call application delivers a recording operation notification to the Audio HAL.

Figure 6B:
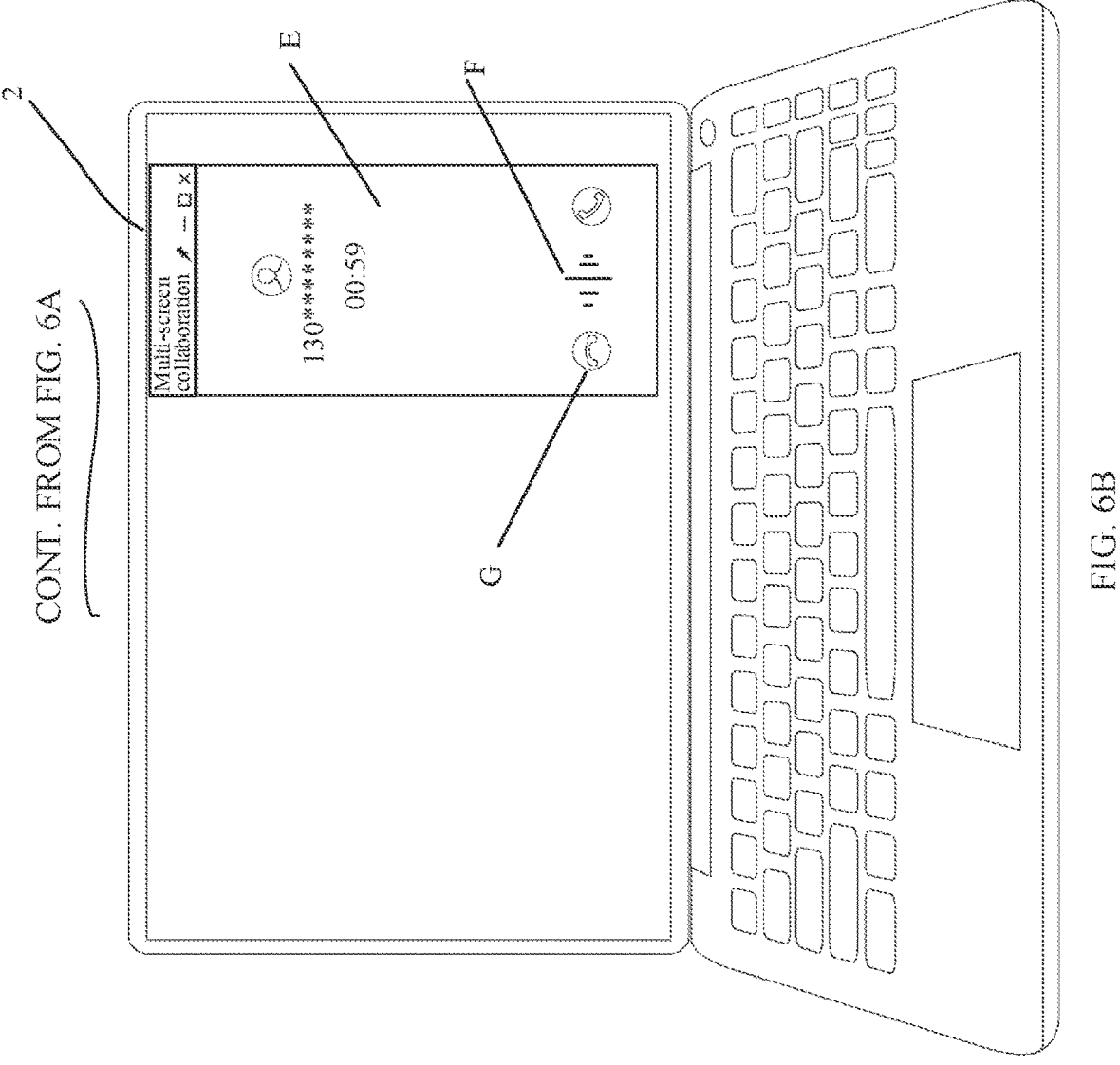

In some applications, with reference to FIG. 6B, the user taps a recording control F in a collaboration call interface E of the notebook computer 2. Then the notebook computer 2 transmits the recording operation notification to the collaboration module 18 through the wireless communication module 110 of the mobile phone 1. The collaboration module 18 transmits the recording operation notification to the call application 15 of the mobile phone 1. The call application 15 delivers the recording operation notification to the Audio HAL17 through the audio service 16, as shown in FIG. 5*b*(1) and FIG. 5*b*(2). In some other applications, with reference to FIG. 6B, the user taps the recording control F in the collaboration call interface E of the notebook computer 2. Then the notebook computer 2 transmits the recording operation notification to the collaboration module 18 through the wireless communication module 110 of the mobile phone 1. The collaboration module 18 of the mobile phone 1 delivers the recording operation notification to the Audio HAL17 through the DMSDP19 (not shown in FIG. FIG. 5*b*(1) and FIG. 5*b*(2)).

S13: The Audio HAL determines a USECASE1.

It can be understood that the Audio HAL determines the USECASE as the USECASE1 based on the recording operation notification and the pre-configured correspondence.

S14: The Audio HAL opens the PCM1 corresponding to the USECASE1.

It can be understood that, as shown in FIG. 6A, after the PCM1 is opened, the call audio uplink data and the call audio downlink data are cached in the PCM1 through the incall record Incall Record path shown in FIG. 5*a*.

S15: The Audio Hal reads the call audio uplink data and the call audio downlink data from the PCM1.

In some implementations, the Audio HAL performs a read operation on the PCM1 device file to read the call audio uplink data and the call audio downlink data from the PCM1.

S16: The Audio HAL transmits the call audio uplink data and the call audio downlink data to the call application.

With reference to FIG. 6A, the Audio HAL17 transmits the call audio uplink data and the call audio downlink data to the call application 15 through the audio service in the audio libraries and the audio service in the phone manager (collectively referred to as the audio service 16 in FIG. 6A).

S17: The Audio HAL closes the PCM1 after the incall record ends or the call ends.

In some implementations, with reference to FIG. 6B, the user taps the recording control F (pressed) in the collaboration call interface E of the notebook computer 2 to disable the recording function, or the user taps a call end control G in the collaboration call interface E to end the call. Then the notebook computer 2 transmits a record end notification or a call end notification to the collaboration module 18 of the mobile phone 1 through the wireless communication module 110. The collaboration module 18 of the mobile phone 1 transmits the recording operation notification to the call application 15 of the mobile phone 1. The call application 15 delivers the incall record end notification or the call end notification to the Audio HAL17 through the audio service 16.

In another implementation, the user taps the recording control F (pressed) in the collaboration call interface E of the notebook computer 2 to disable the recording function, or the user taps the call end control G in the collaboration call interface E to end the call. Then the notebook computer 2 transmits the record end notification or the call end notification to the collaboration module 18 of the mobile phone 1 through the wireless communication module 110. The collaboration module 18 delivers the incall record end notification or the call end notification to the Audio HAL17 through the DMSDP19.

In still another implementation, as shown in FIG. 1c to FIG. 1e, because the collaboration interface displayed in the notebook computer 2, for example, A, C, and D, and E that is shown in FIG. 6B are the same as the interface displayed in the mobile phone 1, the user can further tap the recording control F (pressed) in the call interface of the mobile phone 1 (the same as the call interface E in FIG. 6B) to disable the recording function, or the user taps the call end control G to end the call. The call application 15 responds to the incall record end operation or the call end operation, and transmits the incall record end notification or the call end notification to the Audio HAL17.

It can be understood that S12 to S17 are optional steps, and are not performed in a call process when the call record function is not enabled.

In some implementations, an execution body of S12 to S17 is the audio hardware management module in the Audio HAL.

S18: The call end notification is delivered to the Audio HAL after the DMSDP monitors the end of a call.

In some implementations, before S18, the collaboration module notifies the DMSDP after the end of a call is monitored. After receiving the notification and monitoring the end of the call, the DMSDP delivers the call end notification to the Audio HAL.

It can be understood that, for a manner of monitoring the end of the call by the collaboration module, refer to the manner of obtaining the end of the call by the collaboration module in S17.

S19: The Audio HAL closes the PCM2.

In some implementations, the PCM2 is closed by closing the PCM2 FILE. After the PCM2 is closed, the collaboration downlink path cannot transmit data to the PCM2. This means that the collaboration call downlink path is closed.

S20: The Audio HAL closes the PCM3.

In some implementations, the PCM3 and the collaboration call uplink path are closed by closing the PCM3 file.

As can be seen from FIG. 5b(1) and FIG. 5b(2) and FIG. 6A and FIG. 6B, in the multi-screen collaboration mode, a PCM device and a path with a function occupied are not multiplexed to transmit the call audio data between collaboration devices. Therefore, the conflicts caused by multiplexing a PCM device and a path can be avoided, and further avoid operations including audio mixing and forwarding caused by conflicts, thereby reducing power consumption of the electronic device.

It can be understood that the PCM0 and the emergency call scenario are not drawn in FIG. 6A and FIG. 6B.

However, in a collaboration call scenario, because the PCM0 is not occupied, the emergency call process can be referred to FIG. 3c.

Described in detail are examples of a transmission method for call audio data according to embodiments of this application. It may be understood that to implement the foregoing functions, the electronic device includes corresponding hardware and/or software modules for performing the functions. A person skilled in the art should be easily aware that, in combination with the units and algorithm steps of the examples described in the embodiments disclosed in this specification, this application can be implemented by hardware or a combination of hardware and computer software. Whether a function is performed by hardware or computer software driving hardware depends on particular applications and design constraints of the technical solutions. A person of skill in the art may use different methods to implement the described functions with reference to embodiments for each particular application, but it should not be considered that the implementation goes beyond the scope of this application.

In the embodiments of this application, functional modules of the electronic device may be divided based on the foregoing method examples. For example, functional modules may be divided based on functions, such as ADSP and Modem, or two or more functions may be integrated into one module. The integrated module may be implemented in a form of hardware, or may be implemented in a form of a software functional module. It should be noted that module division in this embodiment of this application is an example and is merely logical function division. During actual implementation, there may be another division manner.

It should be noted that the related content of the steps related to the foregoing method embodiments may be quoted to the functional description of the corresponding functional modules, and details will not be repeated herein.

The electronic device according to this embodiment is configured to perform the call audio device data transmission method, and therefore may achieve the same effect as the foregoing method Embodiments of this application further provide a computer-readable storage medium. A computer program is stored in the computer-readable storage medium. When the computer program is executed by a processor, the method for transmitting the call audio data according to any one of the embodiments is performed by the processor.

Embodiments of this application further provide a computer program product. When the computer program product runs on a computer, a computer is enabled to perform the related steps, to implement the method for transmitting the call audio data in the foregoing embodiments.

In addition, an embodiment of this application further provides an apparatus. The apparatus may specifically be a chip, an assembly or a module. The apparatus may include a processor and a memory connected to each other. The memory is configured to store computer-executable instructions. When the apparatus operates, the processor may execute the computer-executable instructions stored in the memory to cause a chip to implement method for transmitting the call audio data in the above method embodiments.

The electronic device, the computer-readable storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may clearly understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely exemplary. For example, the module or the unit division is merely a logical function division and may be other division during actual implementation. For example, a plurality of units or components may be combined or integrated into another apparatus, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate, and parts displayed as units may be one or more physical units, may be located in one place, or may be distributed in multiple different places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in the form of hardware, or may be implemented in the form of a software function unit.

If the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, a compact disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting call audio data, applied to a first electronic device, wherein the first electronic device comprises a first pulse code modulation (PCM) device, a second PCM device, and a third PCM device, wherein the first PCM device, the second PCM device, and the third PCM device are configured to cache PCM audio data, and wherein the method comprises:

establishing a call with a peer electronic device through a modem in response to a call operation, wherein the first electronic device and a second electronic device are in a multi-screen collaboration mode;

receiving call audio downlink data from the peer electronic device;

storing the call audio downlink data in the first PCM device by:

opening the first PCM device and a collaboration call downlink path by opening a first PCM device file, wherein the collaboration call downlink path is configured to connect the first PCM device and the modem;

transmitting the call audio downlink data in the first PCM device to the second electronic device through the collaboration call downlink path;

receiving call audio uplink data from the second electronic device;

storing the call audio uplink data in the second PCM device by:

opening the second PCM device and a collaboration call uplink path by opening a second PCM device file, wherein the collaboration call uplink path is configured to connect the second PCM device and the modem;

transmitting the call audio uplink data in the second PCM device to the peer electronic device through the collaboration call uplink path; and storing the call audio uplink data and the call audio downlink data in the third PCM device in response to an incall record operation.

2. The method according claim 1, wherein the transmitting the call audio downlink data in the first PCM device to the second electronic device comprises:

reading the call audio downlink data from the first PCM device by performing a read operation on the first PCM device file; and transmitting the call audio downlink data to the second electronic device.

3. The method according to claim 1, wherein the storing the call audio uplink data in the second PCM device, comprises:

performing a write operation on the second PCM device file.

4. The method according to claim 1, wherein the storing the call audio uplink data and the call audio downlink data in the third PCM device comprises:

opening the third PCM device and an incall record path by opening a third PCM device file, wherein the incall record path is configured to connect the third PCM device and the modem.

5. The method according to claim 4, further comprising:

obtaining the call audio uplink data and the call audio downlink data from the third PCM device by reading the third PCM device file; and recording the call audio downlink data and the call audio uplink data.

6. The method according to claim 4, further comprising:

closing, in response to an incall record end operation or a call end operation, the third PCM device by closing the third PCM device file.

7. The method according to claim 6, further comprising:
in response to the call end operation, closing the first PCM device by closing a first PCM device file, and closing the second PCM device by closing a second PCM device file.

8. The method according to claim 1, wherein before the storing the call audio downlink data in the first PCM device and the storing the call audio uplink data in the second PCM device, the method further comprises:
determining a PCM device corresponding to the downlink call scenario in the multi-screen collaboration mode as the first PCM device and determining a PCM device corresponding to the uplink call scenario in the multi-screen collaboration mode as the second PCM device.

9. The method according to claim 1, wherein before the establishing the call with the peer electronic device in response to the call operation, the method further comprises:
displaying a collaboration window, wherein the collaboration window comprises a dialing interface or an incoming call interface displayed on the second electronic device; and
wherein the establishing the call with the peer electronic device in response to the call operation comprises:
establishing the call with the peer electronic device in response to the call operation on the dialing interface or the incoming call interface.

10. The method according to claim 9, wherein before the displaying the collaboration window, the method further comprises:
starting the multi-screen collaboration mode with the second electronic device through near field communication (NFC), Bluetooth, or in a wired manner.

11. An electronic device, comprising:
a memory configured to store a program; and
a processor configured to execute the program to implement a method for transmitting call audio data, the method comprising:
establishing a call with a peer electronic device through a modem in response to a call operation, wherein the electronic device and a second electronic device are in a multi-screen collaboration mode;
receiving call audio downlink data from the peer electronic device;
storing the call audio downlink data in a first pulse code modulation (PCM) device by:
opening the first PCM device and a collaboration call downlink path by opening a first PCM device file, wherein the collaboration call downlink path is configured to connect the first PCM device and the modem;
transmitting the call audio downlink data in the first PCM device to the second electronic device though the collaboration call downlink path;
receiving call audio uplink data from the second electronic device;
storing the call audio uplink data in a second PCM device by:
opening the second PCM device and a collaboration call uplink path by opening a second PCM device file, wherein the collaboration call uplink path is configured to connect the second PCM device and the modem;
transmitting the call audio uplink data in the second PCM device to the peer electronic device through the collaboration call uplink path; and storing the call audio uplink data and the call audio downlink data in a third PCM device in response to an incall record operation.

12. The electronic device according to claim 11, wherein the transmitting the call audio downlink data in the first PCM device to the second electronic device comprises:
reading the call audio downlink data from the first PCM device by performing a read operation on the first PCM device file; and
transmitting the call audio downlink data to the second electronic device.

13. The electronic device according to claim 11, wherein the storing the call audio uplink data in the second PCM device comprises:
opening the second PCM device and a collaboration call uplink path by opening a second PCM device file, wherein the collaboration call uplink path is configured to connect the second PCM device and the modem; receiving the call audio uplink data from the second electronic device; and storing the call audio uplink data in the second PCM device by performing a write operation on the second PCM device file.

14. A non-transitory computer-readable storage medium configured to store a computer program that, when executed by a processor, causes a computing device to implement a method for transmitting call audio data, the method comprising:
establishing a call with a peer electronic device through a modem in response to a call operation, wherein the computing device and a second electronic device are in a multi-screen collaboration mode;
receiving call audio downlink data from the peer electronic device;
storing the call audio downlink data in a first pulse code modulation (PCM) device by:
opening the first PCM device and a collaboration call downlink path by opening a first PCM device file, wherein the collaboration call downlink path is configured to connect the first PCM device and the modem;
transmitting the call audio downlink data in the first PCM device to the second electronic device through the collaboration call downlink path;
receiving call audio uplink data from the second electronic device;
storing the call audio uplink data in a second PCM device by:
opening the second PCM device and a collaboration call uplink path by opening a second PCM device file, wherein the collaboration call uplink path is configured to connect the second PCM device and the modem;
transmitting the call audio uplink data in the second PCM device to the peer electronic device through the collaboration call uplink path; and
storing the call audio uplink data and the call audio downlink data in a third PCM device in response to an incall record operation.

15. The non-transitory computer-readable storage medium according to claim 14, wherein the transmitting the call audio downlink data in the first PCM device to the second electronic device comprises:
reading the call audio downlink data from the first PCM device by performing a read operation on the first PCM device file; and
transmitting the call audio downlink data to the second electronic device.

16. The non-transitory computer-readable storage medium according to claim 14, wherein the storing the call audio uplink data in the second PCM device comprises:

performing a write operation on the second PCM device file.

* * * * *